US00RE36653E

United States Patent [19]

Heckel et al.

[11] E Patent Number: Re. 36,653

[45] Reissued Date of Patent: Apr. 11, 2000

[54] SEARCH/RETRIEVAL SYSTEM

[76] Inventors: Paul C. Heckel, 146 Main St., Suite 404, Los Altos, Calif. 94022; Charles H. Clanton, 220 Downey St., San Francisco, Calif. 94177

[21] Appl. No.: 07/504,679

[22] Filed: Apr. 4, 1990

Related U.S. Patent Documents

Reissue of:

[64] Patent No.: 4,736,308
Issued: Apr. 5, 1988
Appl. No.: 06/754,512
Filed: Jul. 10, 1985

U.S. Applications:

[63] Continuation-in-part of application No. 06/647,649, Sep. 6, 1984, abandoned.

[51] Int. Cl.[7] ..... G06F 3/14

[52] U.S. Cl. ..... 345/340; 345/123; 345/131; 345/419; 345/435; 348/107; 707/507; 707/508

[58] Field of Search ..... 364/521, 200, 364/900, 518; 340/721, 723, 724, 726; 395/100, 118, 144, 145, 146, 148, 149, 153, 155, 157, 158, 600; 345/115, 116, 119, 120, 123, 127

[56] References Cited

U.S. PATENT DOCUMENTS

| | | | |
|---|---|---|---|
| Re. 31,200 | 4/1983 | Sukonick et al. | 345/24 |
| 3,757,037 | 9/1973 | Bialek | 348/107 |
| 3,792,462 | 2/1974 | Casey et al. | 340/726 |
| 4,240,075 | 12/1980 | Bringol | 345/25 |
| 4,366,475 | 12/1982 | Kishi et al. | 345/131 |
| 4,386,410 | 5/1983 | Pandya et al. | 707/531 |
| 4,412,294 | 10/1983 | Watts et al. | 707/529 |
| 4,417,322 | 11/1983 | Berry et al. | 707/523 |
| 4,418,345 | 11/1983 | Demke et al. | 345/27 |
| 4,428,065 | 1/1984 | Duvall et al. | 707/7 |
| 4,429,372 | 1/1984 | Berry et al. | 707/508 |
| 4,430,725 | 2/1984 | Elliott et al. | 707/511 |

(List continued on next page.)

OTHER PUBLICATIONS

Macintosh (TM), Apple Computer, Inc., pp. 1–8, 20–34, 50–61, 82–84, 91–92, and 155–160, 1983.

Timeworks 'SwiftCalc ST' User's Manual, pp. 55–57, 67, 68, 78–80, 1982.

Todd 'Abbreviated Typing for Word Processing', 2BM TDB, vol. 21, No. 9, pp. 3796–3797, Feb. 1979.

Bringol 'Abbreviated Character Font Display', 2BM TDB, vol. 19, No. 9, pp. 3248–3249, Feb. 1977.

(List continued on next page.)

*Primary Examiner*—Thomas C. Lee
*Assistant Examiner*—Chien Yuan
*Attorney, Agent, or Firm*—Steven Lundberg

[57] ABSTRACT

A computer program provides for the display of selected portions of two or more records on a display screen where the portions selected are from different records, and may be from different files. Provision is made for scrolling of the full text of the displayed records, which may be grouped by common subject matter.

Alternatively one of the two or more records may be displayed on the full screen with the capability for selectively switching between the single record and two or more records or a display showing portions of more than one record from more than one file.

96 Claims, 14 Drawing Sheets

U.S. PATENT DOCUMENTS

| | | | |
|---|---|---|---|
| 4,434,475 | 2/1984 | McCaskill et al. | 345/352 |
| 4,435,777 | 3/1984 | McCaskill et al. | 707/531 |
| 4,435,778 | 3/1984 | Cason et al. | 707/509 |
| 4,459,678 | 7/1984 | McCaskill et al. | 345/326 |
| 4,481,603 | 11/1984 | McCaskill et al. | 707/507 |
| 4,486,857 | 12/1984 | Heckel | 707/508 |
| 4,495,600 | 1/1985 | Kikuchi et al. | 712/300 |
| 4,506,343 | 3/1985 | Shipp, Jr. et al. | 707/509 |
| 4,507,753 | 3/1985 | McCaskill et al. | 707/508 |
| 4,538,183 | 8/1985 | Kanno et al. | 358/452 |
| 4,542,376 | 9/1985 | Bass et al. | 345/340 |
| 4,550,315 | 10/1985 | Bass et al. | 345/199 |
| 4,555,759 | 11/1985 | McCaskill et al. | 707/531 |
| 4,586,035 | 4/1986 | Baker et al. | 345/157 |
| 4,591,840 | 5/1986 | Curtis et al. | 345/156 |
| 4,616,327 | 10/1986 | Rosewarne et al. | 345/435 |
| 4,618,858 | 10/1986 | Belch | 345/28 |
| 4,633,415 | 12/1986 | Vink et al. | 345/123 |
| 4,633,430 | 12/1986 | Cooper | 707/500 |
| 4,642,790 | 2/1987 | Minshull et al. | 345/341 |
| 4,645,238 | 2/1987 | Vincent et al. | 283/67 |
| 4,646,250 | 2/1987 | Childress | 707/507 |
| 4,649,377 | 3/1987 | Urabe | 345/118 |
| 4,649,499 | 3/1987 | Sutton et al. | 345/419 |
| 4,649,513 | 3/1987 | Martin et al. | 707/526 |
| 4,653,020 | 3/1987 | Cheselka et al. | 345/344 |
| 4,692,757 | 9/1987 | Tsuhara et al. | 345/116 |
| 4,700,320 | 10/1987 | Kapur | 345/344 |
| 4,710,762 | 12/1987 | Yamada | 345/507 |
| 4,755,809 | 7/1988 | Ikegami et al. | 345/340 |
| 4,791,561 | 12/1988 | Huber | 707/1 |
| 4,805,099 | 2/1989 | Huber | 707/102 |
| 4,823,108 | 4/1989 | Pope | 345/340 |
| 4,870,611 | 9/1989 | Martin et al. | 707/526 |
| 4,872,001 | 10/1989 | Netter | 345/340 |
| 4,888,690 | 12/1989 | Huber | 707/4 |
| 4,947,370 | 8/1990 | Sugitani | 400/63 |

OTHER PUBLICATIONS

*DB Master* personal computer program manual copyrighted 1980 by Barney Stone and Alpine Software, published by Stoneware. pp. 11–21, 58–63.

*Apple Works Made Easy* Carole Boggs Matthews published by Osborne McGraw–Hill copyright 1990. pp. 97–137.

*Lisalist* copyright 1983, Apple Computer. Page Column B, Chapter 1 and Section C, Chapter 1.

*Sequitur* copyright 1982, 1984 the Community Memory Project Published by Golemics Inc., Berkeley, CA Section 2.

Visicalc Est. 1978 a conventional spread sheet program. pp. 1–1 through 1–7, 2–8 through 2–12 and 3–2 through 3–4.

FIGURE 8
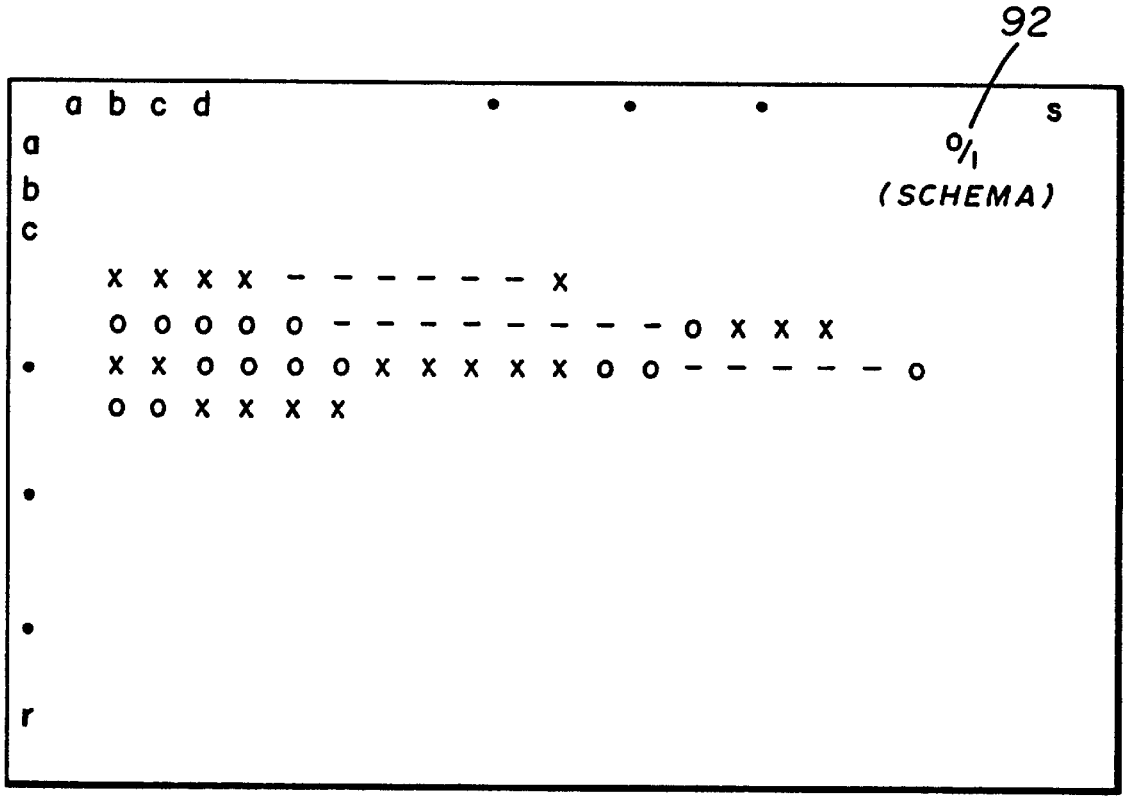
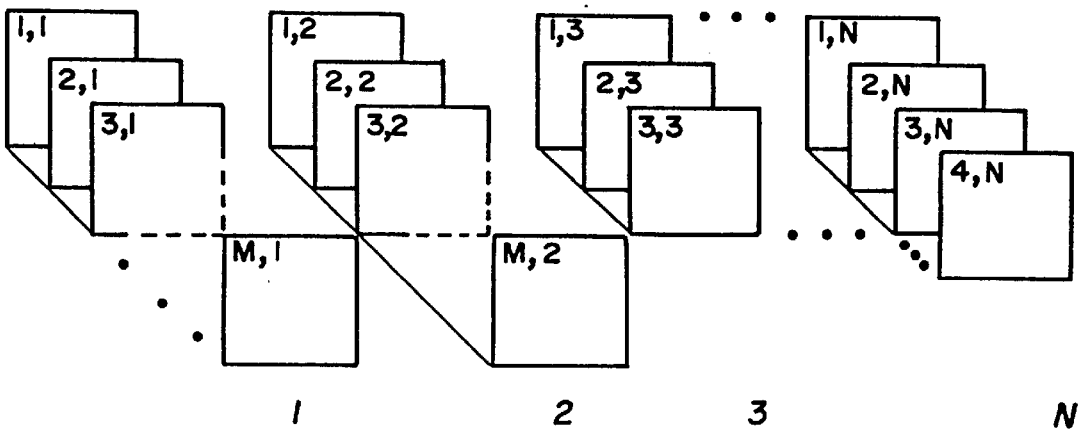
FIGURE 9

SEARCH/RETRIEVAL SYSTEM

Matter enclosed in heavy brackets [ ] appears in the original patent but forms no part of this reissue specification; matter printed in italics indicates the additions made by reissue.

This is a continuation-in-part of application Ser. No. 647,649, now abandoned, filed Sept. 6, 1987.

DESCRIPTION

1. Technical Field

This invention relates to searching for and subsequent display of portions of various data fields in stored records. In particular, it relates to display devices which have limited display capability but where information to be displayed is from several records and where the amount of information may exceed the display size.

2. Background of the Invention

The data processing field has now reached the point where portable computing is available in relatively small sizes. In particular, computers with a relatively large storage capacity are available with dimensions not much larger than a piece of typing paper and that will conveniently fit into an attache case and operate from battery power. While this invention is addressed to these small portable computers, it is equally applicable to the non-portable or larger size computers. The impetus for the invention is the lack of search and retrieval systems wherein selected portions of more than one record can be displayed concurrently.

"Windowing," a capability available with some operating systems, enables a user to display at least portions of more than one record or portions of a large record (e.g., a matrix) in a format selected from and controlled by the operating system on a single video display device. Usually, one formatted record is overlayed upon another formatted record so that portions of intelligence may be lost. Since the associated operating system is usually controlling in a "window" situation, a user may be able to operate on the displayed data, e.g., make changes. The window concept usually does not provide for shorter or abbreviated data fields within a record. Consequently because of the size parameters of the requested window incomplete and in some cases unintelligible information is shown.

In addition to the shortfall of windowing, the small tablet-size computer usually has a limited display space. Specifically, this display space may allow for ten to fifteen rows of information with each row containing fifty to seventy-five characters. Thus, in the windowing examples set forth above, if one were to display two or more records at one time, the fifteen by seventy-five character display area must be divided in some proportion. Without a proper schema to display the individual records, the records will be truncated by the amount of available display space.

U.S. Pat. No. 4,486,857 issued on Dec. 4, 1984 to Paul Heckel, the inventor herein, and assigned to Quickview Partners of Los Altos, Calif. provides for compression of data fields such that vowels may be removed from names, streets, cities and the like, thus reducing the display requirements for particular records. For example, the names "Smith" may be abbreviated to "Smth." This capability, while serving the function set forth in the earlier application, is limited to a single record at a time, and further does not have the capability for selective display of data fields within a particular record, but rather gives sequential display of all the data fields. That is to say, while the various fields may be abbreviated by removal of certain characters, all of the fields are sequentially displayed when the entire record is "perused."

The result of the present technology is that while portions of multiple records may be concurrently displayed on a display device, unabbreviated portions are selected sequentially as they appear in the record and not by the intelligence contained in the fields.

SUMMARY OF THE INVENTION

It is an object of this invention to provide means for and a method of simultaneously displaying selected portions of different records from one or more files stored in a computer. It is a further object to provide for the scanning of adjacent records or files while retaining the limited displayed portions of the adjacent or juxtaposed records.

This invention is for a computerized data system having a data string input device, a processor, a storage device for storing independent strings of data, each of variable length, with each string having several fields. The independent strings may be classifiable into groups with each group having strings with at least one similar field. The invention also includes an output device having a limited display capability. The data retrieval and display system comprises means for locating each stored string of data and means for simultaneously displaying on the output device preselected portions of a first independent string and preselected portions of a second independent string. The first and second strings may be from different groups. The secod string preselected portions have a display length less than the displayed length of the first string preselected portions.

This invention overcomes the failure of the earlier devices by providing simultaneous display of different preselected portions of various data strings contained in one or more files stored in a computer.

BRIEF DESCRIPTION OF THE DRAWINGS

FIG. 8 is a representative record layout.

FIG. 9 is a representation of the multiple file structure.

DETAILED DESCRIPTION OF THE PREFERRED EMBODIMENT

This invention deals with the concurrent display of portions of several records from separate files stored in a relatively small microprocessor.

In order to better understand the description that follows, one should understand that conventional terms are used to refer to the data being manipulated and displayed. This data will be considered to be ordered to the extent that there are two or more files where each file is an organized collection of records. Each record consists of an independent data string of one or more data elements or fields. In the particular embodiment discussed below, the system can be compared to a series of racks such as is seen adjacent a time clock. Each rack is comparable to a file with each rack or file associated with a division or department. Each record is comparable to an individual time card. The elements of information on each time card such as name, address, pay rate, etc. are comparable to the data elements or fields. Hereinafter the terms file, record, and field will generally be used in the context set forth above. When referring to the "rack/card" analogy, reference may be made to a column to signify a "rack" or file and to row to indicate the positioning of "card" or record in the file.

Figure 1:
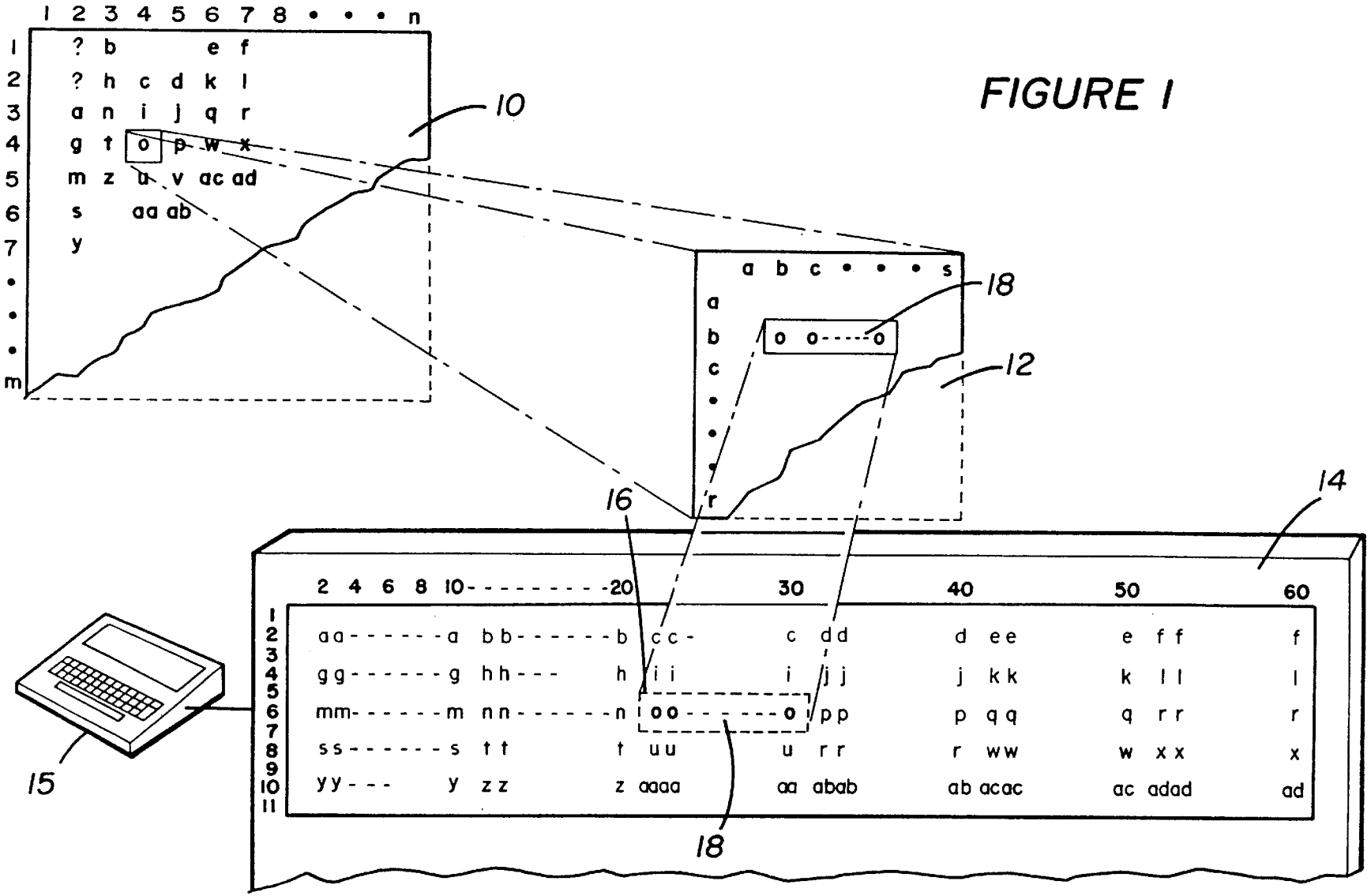
FIG. 1 is an illustration of the relation of the display to the data portions of the record, and then to the file, and finally to a composite group of files.

In FIG. 1, the composite file structure is indicated at 10, while an individual record (card) is indicated at 12, and the display of selected portions (fields) of record 12 along with selected portions of other records are indicated at 14. Composite file structure 10 is comprised of a plurality of records that by appropriate classification could be formed into an m×n matrix. Where there are n files and up to m records in each file (see FIG. 9). While the matrix format is used in this specification, it is to be understood that the actual storage of the individual records within an individual microprocessor or storage unit associated with a computer would not necessarily be in matrix format. A matrix format is chosen simply because the structure of the various files is such that the individual records in certain files can be classified by at least one data element of common subject matter. The matrix format also represents mathematically the metaphoric rack/card concept previously discussed. One can consider that there are n files with up to as many as m individual records in each file (column). Referring to FIG. 8, the individual record itself may be composed of "r" lines of data lines where each line may contain up to s characters or pixels (the width). More will be said about the record layout subsequently. In FIG. 9, it can be seen that each individual "column" or file need not necessarily have m records. In FIG. 9, the records are represented in the familiar row matrix format, 1,1; 2,1; 3,1 wherein the first numeral represents the sequential record or row and the second numeral, indicates the file number or column when using the row column matrix convention. Referring again to FIG. 1, record 12 is the fourth record from the fourth file.

Each record, as indicated in FIG. 8, contains intelligence normally in a character format that would normally be divided into different fields. However, it is conceivable that the intelligence may be stored in some other form such as an ideographic or pictorial representation or the intelligence may be in free form rather than divided into fields so that a record can be composed of several rows of text such as a document.

Associated with each record is a schema 92 which may be unique to the record or which may be common to the file. The schema describes the data or intelligence (e.g. the field names) that is contained in the record and a view mechanism or "viewboard" that describes how the data is to be displayed.

It is to be understood at this point that the records and files may be ordered and further that the ordering can be modified at will so that records will be "moved" in the file and further may be moved to a new or different file. Movement of a record will re-order the file. Conveniently the order may be alphabetical by any desired field.

It may also be appropriate to include movement of fields within the record. Similar to the record movement, field movement may reorder all the records in the file.

The schema in addition to the data description includes, as the "viewboard," the height of the record, or the number of lines as indicated in FIG. 8 and shown as "r" in the representation in FIG. 8. It also contains the width "s" as shown in FIG. 8. The total length of the record, or more properly the string of data elements or fields, while variable, is always less than some value "t." Finally the schema is the record description. If all the records in one file contain similar fields then a file or rack schema is all that is necessary. However, since variations within a file are permitted an individual record schema may be used. Reordering of the record may, of course, change the schema. The schema may also include information as to the order and position that individual fields will be displayed. Specifically, the display line may be specified in the schema for each fields. This will become clearer in the subsequent discussion. Hereinafter "line" will sometimes refer to the display of data on a video display device.

In the event the intelligence that is contained in the record is not in character format, the display lines and columns may be considered as a number of pixels in each line and column. For convenience, in this specification, a character will be considered as a single pixel. Other measurement units could just as well be used.

The viewboard indicates how the data contained in the record is to be displayed within a rectangle equal to or less than r lines and s columns, where r and s are equal to or less than the screen display size as expressed in pixels. It should be understood that other means of display than the line-column relationship could be used.

Associated with a file or column schema is an index of records contained in the file. The index also contains an indication of the first record that is normally to be displayed on the screen. For example, in FIG. 1, a portion of record 'a' is displayed in the first column and first line of display 14. It can be seen from the file matrix 10 that this record is in row 3, and column 2. In addition to the first record to be displayed, the file schema may also designate a current record in the file for the file or column. In the example shown in FIG. 1, record "o" is the current record in the fourth file. Finally, the file or column schema contains the display coordinates of the current record *or string*. These coordinates will be referred to as the "X" anchor (xth column) and the "Y" anchor (yth line). In the example shown in FIG. 1, the "X" anchor and "Y" anchor is indicated at numeral 16.

In FIG. 1, for the 11 row by 61 column display, the "X" anchor is at "X" coordinate 22, and the "Y" anchor is at "Y" coordinate 5 wherein the "X" coordinates read from left to right and the "Y" coordinates read from the top down. These coordinates are repeated in FIGS. 10 through 15.

It should be understood that a record in a particular file could constitute the list of records in that file and further could contain the information that is denoted above as the schema. It should also be understood that each record can be analogized to a card with certain information contained therein. Such cards could constitute address cards or appointment cards or the like.

Referring again to FIG. 1, the display device 14 can be considered as a viewing board on which portions 18 or all of a record 12 may be displayed (assuming the record does not exceed the display size). The display area has associated with it a series of parameters, referred to as the viewboard, that determine how the various records are to be presented on the display device 14. For example, a current file or column *or group* is contained therein. In addition, the height of the display and the width of the display are also contained in the viewboard. In FIG. 1, the height of the display is sufficient to display eleven lines of characters, and sixty-one columns of characters. The width in which a file or portions of a file may be displayed is also a portion of the viewboard. This is referred to as the column width. In the example given in FIG. 1, the column width is ten characters or pixels. Each record height is also given in the parameters. In FIG. 1, the record height is one line.

Figure 11:
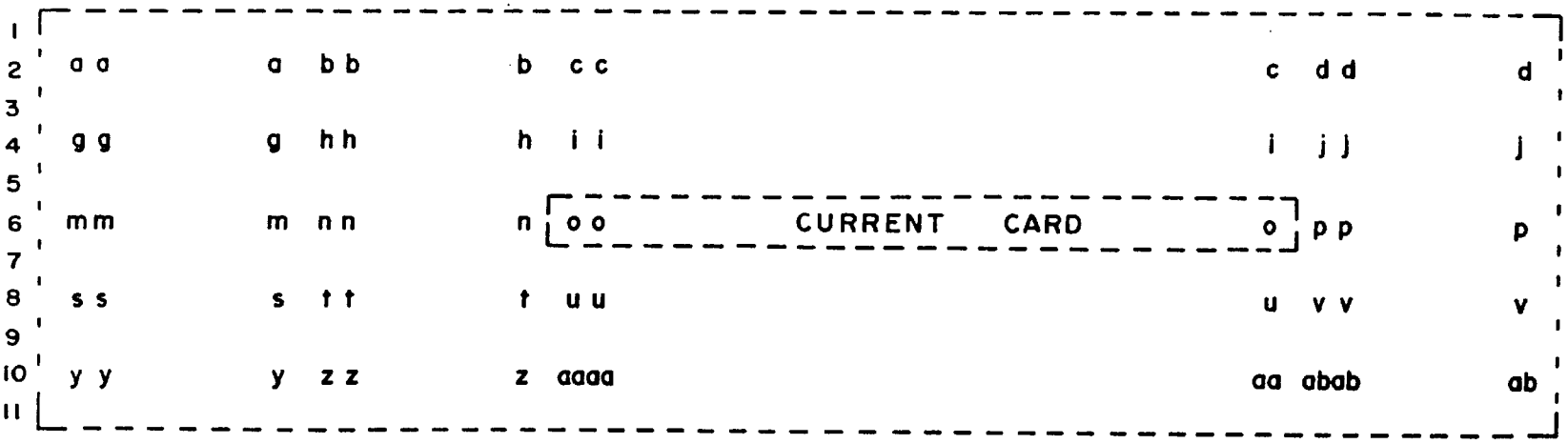
FIG. 11 is a similar change in the display representation after a second parameter change.

In addition to giving the standard record height, the current column may be expanded to display a larger area than the adjacent column. This is shown in FIG. 11, where the current column or third column has a width of thirty characters, while retaining the one character height.

Figure 14:
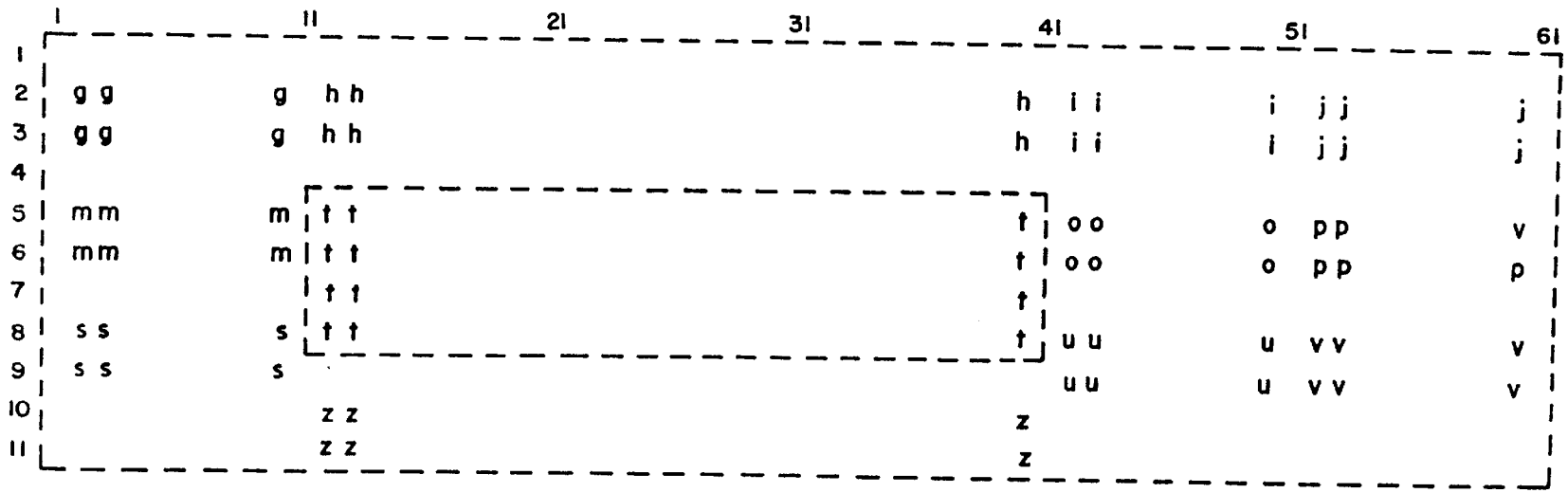

The current record height may also be expanded to show more information. This is illustrated in FIG. 14, wherein the current column is 30 characters or pixels wide and the current card (in FIG. 14, this is the "t" record) is four pixels high, while the remaining records are two pixels both in the current column and the displayed columns adjacent to the current column. It will be seen that these parameters may be changed by the user with the only restriction on the user being the actual video display area as indicated in FIG. 1.

Should the user so wish, either a single column with its m records can be displayed with, for example, only one line per record or card showing. Of course, more lines can be displayed (See FIGS. 16 and 17). Similarly a single record or card may be displayed in the entire screen with the only limitation being the actual display size (see FIG. 16).

Figure 16:
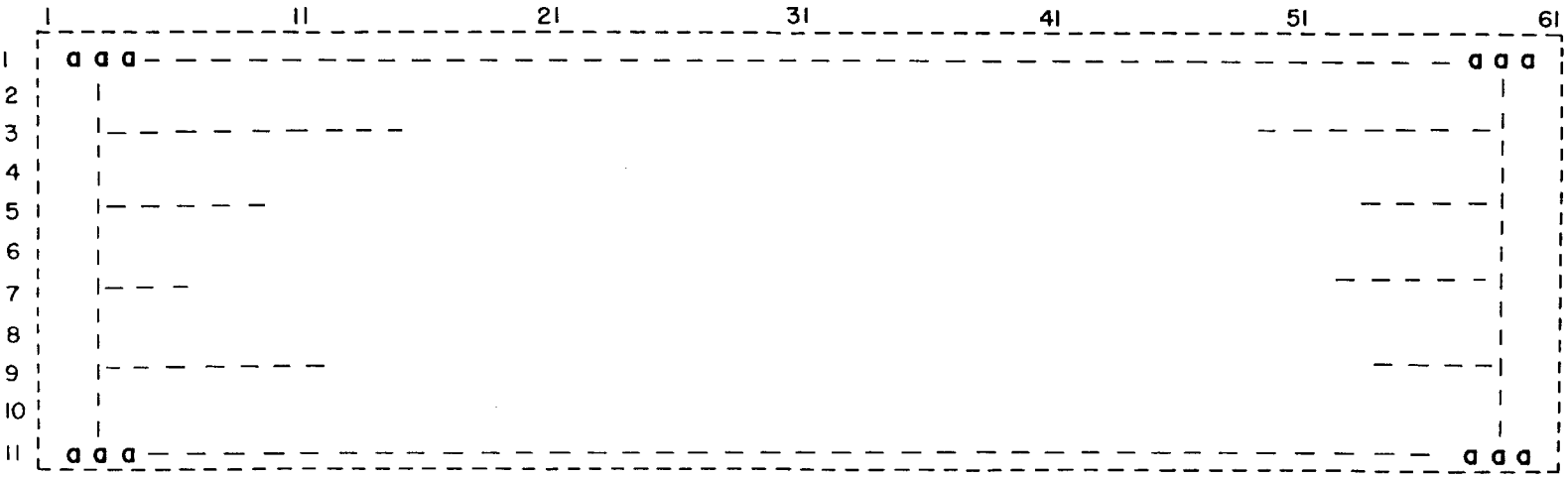
FIG. 16 is a single record representation.
Figure 17:
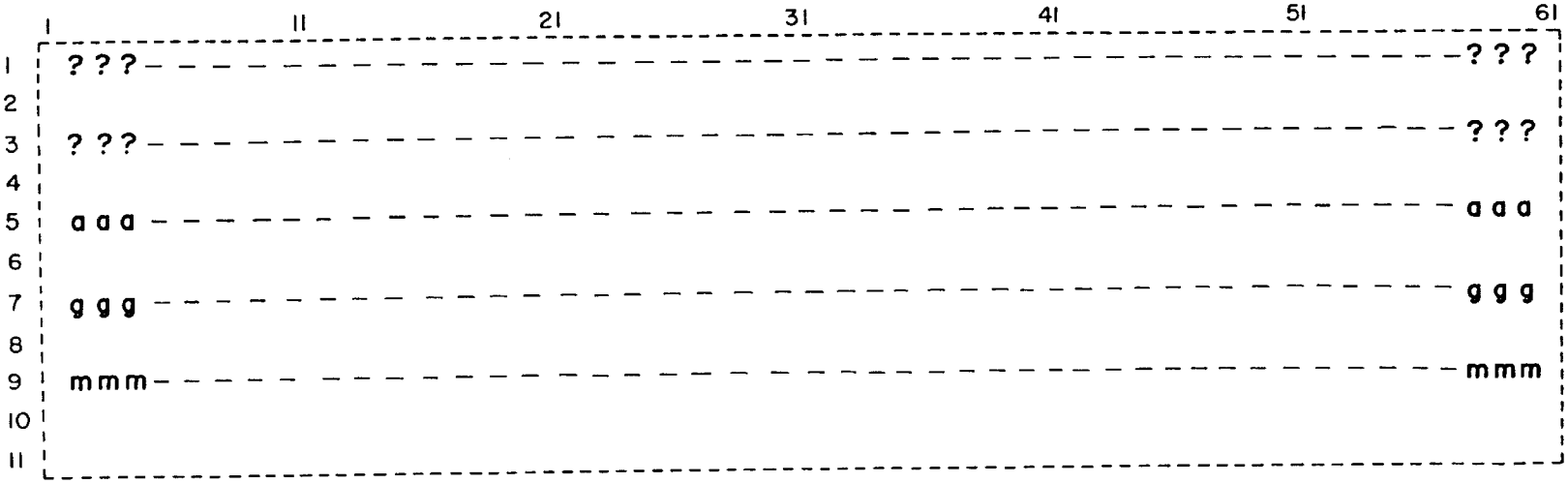
FIG. 17 is a representation of several records each on a single line.

A capability to shift from the multi-file display as shown in FIG. 14 to the single file display as shown in FIG. 17 and finally to the single record as shown in FIG. 16 gives one the capability to rapidly zoom in on the explicit detail contained in a specific record. Conversely one can figuratively back away from the single record detail to the FIG. 14 multi-file display with usually a single command or key-stroke. This capability can be compared to a zoom lens on a camera where one gets either a detail look or a broad view. It differs form the well known "window" in that the instant invention provides the "magnification" of a zoom lens while a "window" overlays a different portion of the detailed view without the "magnification."

Finally, when displaying several cards or records in the multi-field mode where the fields would normally be abbreviated as taught in U.S. Pat. No. 4,486,857, the unabbreviated field along with its label can be scrolled cross the screen so that the user can "see" the full field. For example a fictitious organization, "Johnson Machine Works" may be the full name while the abbreviated name 450 (see FIG. 18) would be "Jhn Mchn W" in a ten character field. When "scrolling" is selected the field name 452, in this case NAME and JOHNSON MACHINE WORKS will appear sequentially moving across the display area in the 10 character field as shown. The Roman numerals I, II, III, IV and V show the name as it moves across the field.

THE PROGRAM

FIGS. 2 through 6 illustrate the logic associated with the operation of video search and retrieval systems. It is to be assumed that the display device 14 has an underlying operating system that provides the necessary program functions to display characters and the like on the screen associated with the display device. The screen may be either of the liquid crystal type, a cathode ray tube, or some other appropriate display device.

Figure 2:
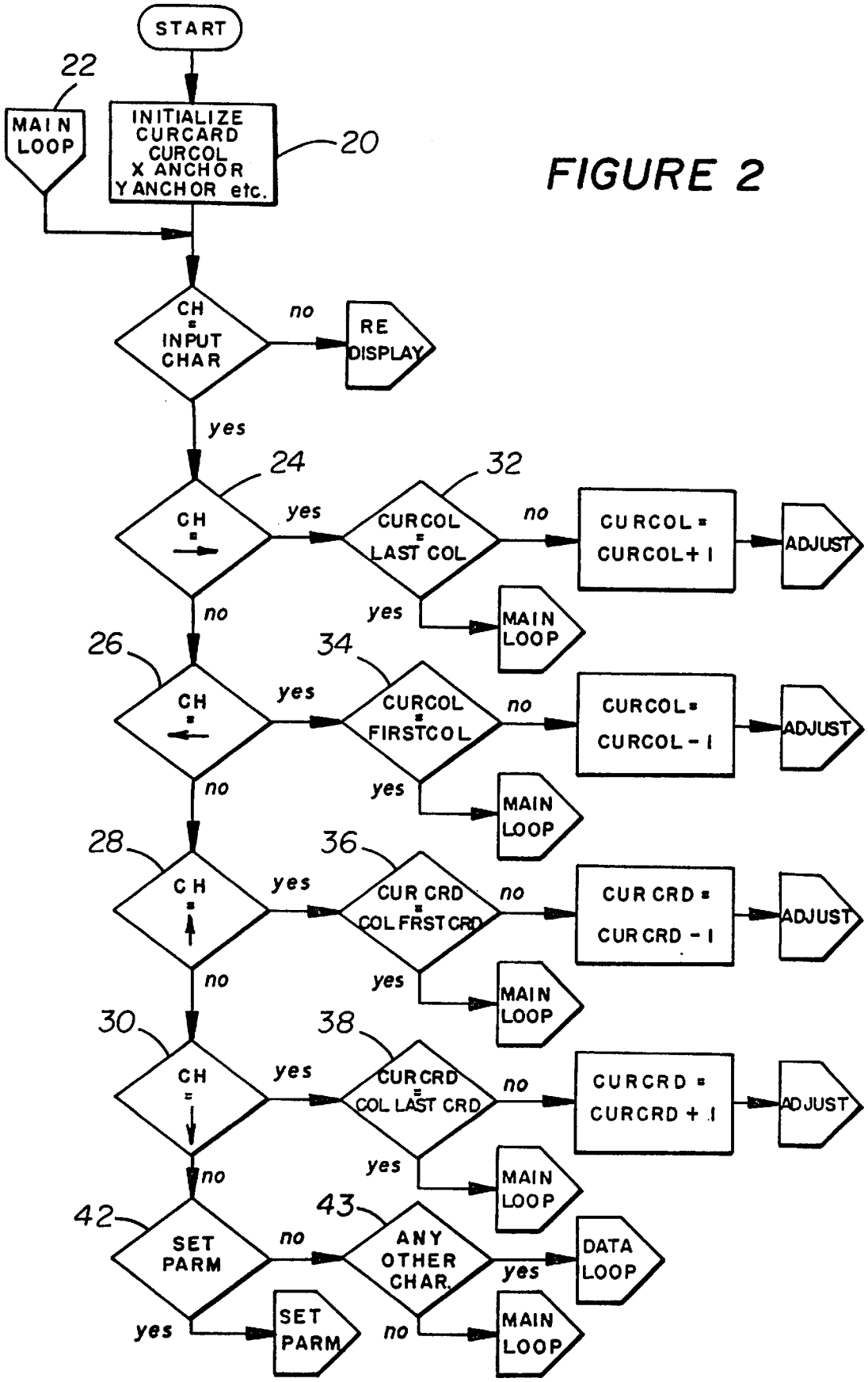
FIGS. 2, 2a, 2b, 3, 4, 5, 6 and 7 are flow charts of a representative program that operate this scheme.

At the time the system is turned on, the user may be given an option to initialize the viewboard parameters for a multi-file display, particularly those indicated in the block in FIG. 2. Alternatively, the first file is shown in the manner of FIG. 17, with one line from the first several records.

The parameters for a multi-file display include the current card or record, the current column or file, the "X" anchor and "Y" anchor and other parameters such as the display height, the display width, and the like. The program then enters a continuous perpetual loop denoted "main loop" at the entry arrow 22 in FIG. 2. This main loop is continuous and is entered upon the sensing of one of a set of particular characters, such as a right arrow; a left arrow; an up arrow; a down arrow; or a command to reset the parameters. It also recognizes certain display parameters such as a full column presentation, a full record presentation or a scrolling of an individual field. If some other character is sensed the program will enter a data manipulation or maintenance subroutine. If no character is sensed, the system is directed to a redisplay function. As previously noted, it may be appropriate to select a default set of parameters so that at start up time the full column presentation shown in FIG. 17 will appear. Subsequent change of parameters will provide the display shown at 14 in for example FIG. 1.

As will be seen, the arrow commands will move from one record to the next adjacent record depending upon the direction indicated by the arrow as shown in the decision blocks 24, 26, 28 and 30. Should the shift in the current record/card or column/file exceed the number of cards or columns, as indicated by the second series of decision blocks 32, 34, 36 and 38, the program returns to the main loop without further action. However, if the action is permissible, that is, there are still undisplayed files/columns or undisplayed cards/records, then the current file/column is indexed accordingly and the program jumps to the "adjust" function 40 in FIG. 3.

If, on the other hand, the character sensed in the main loop as shown in FIG. 2 indicates a change in parameters (i.e., the viewboard), then the decision block 42 will shift the program to the "set params" function 44 (FIG. 3) which is always immediately followed by the "adjust" function 40 just mentioned.

Figure 2A:
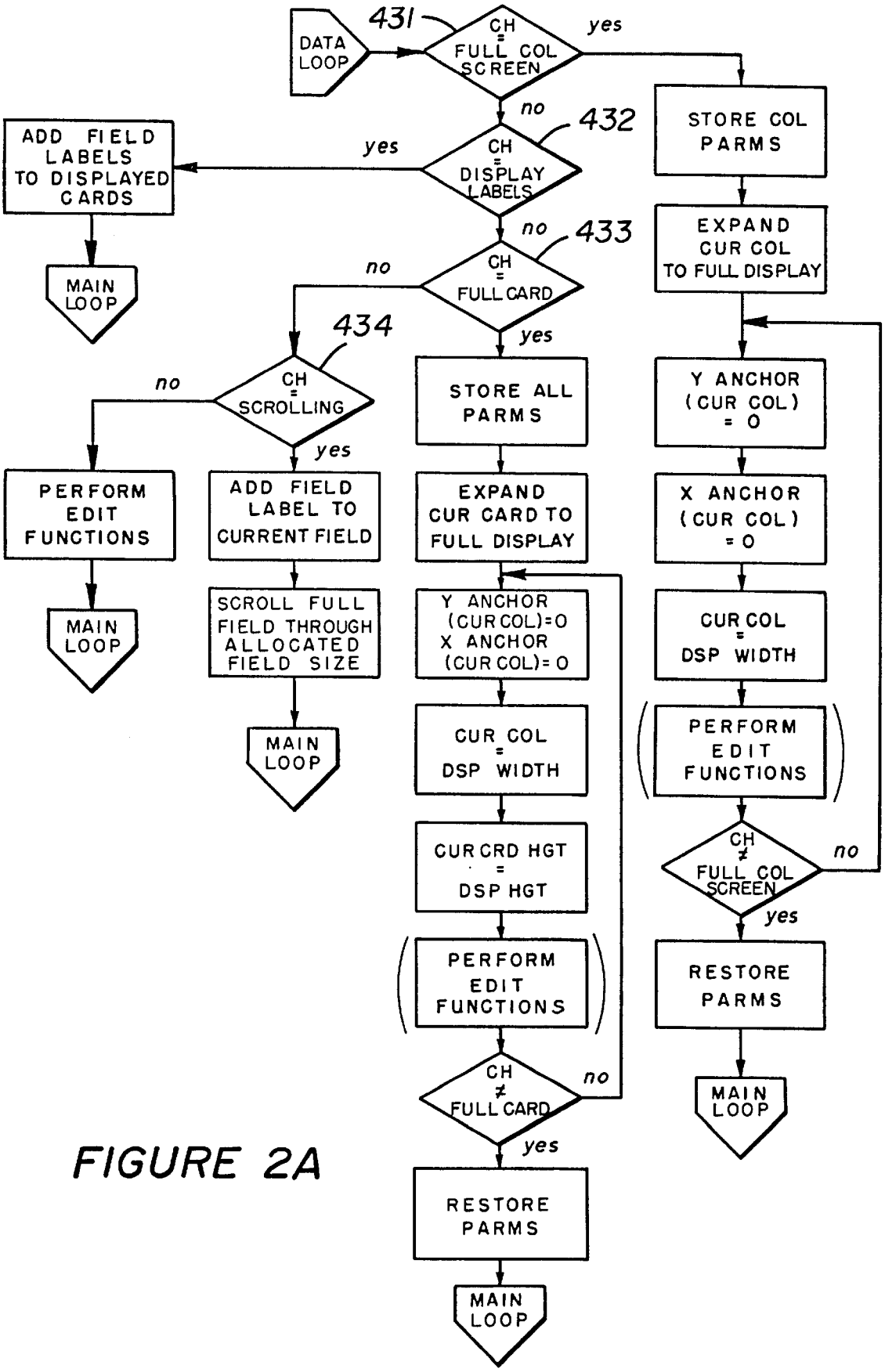
Figure 18:
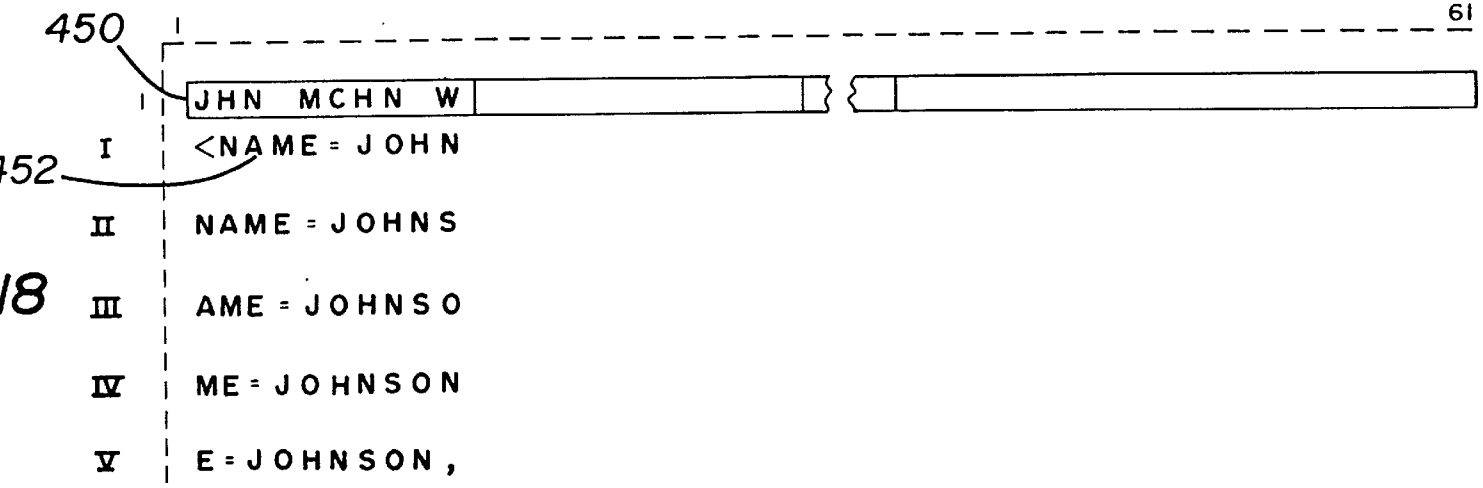
FIG. 18 is a representation of the "scrolling" feature of this invention.

If some other character is sensed decision block 43 (FIG. 2) will shift operation to a data loop subroutine shown in FIG. 2a. In addition to the usual edit and data manipulation functions which are well known, this data loop subroutine provides for full screen display of portions of one group or file (i.e. each record portion extends across the full display) at decision block 431. Decision block 432 will display field labels, while decision block 433 will display a full record or card. Decision block 434 will "scroll" a field name and the data in that field across the abbreviated field size as shown in FIG. 18. If the answer to all the decisions 431–434 is no, then the edit functions are performed before returning to the Main Loop (FIG. 2). In all of these situations the viewboard parameters (which are discussed in the next paragraph) are stored until the display is returned to the default condition as shown in FIG. 1 unless the default is set at a full column display (FIG. 16 or 17). It is pointed out that the full column displayed will be the current column and the full card displayed will be the current card. As can be seen from the flow chart (FIG. 2 and 2a) one can readily switch from the multi record display to the single column or card display and back again with only one key stroke.

The "set params" function 44 accepts at least four parameters from the user which determine the display area for the various records and files displayed on device 14. In the present invention, the parameters accepted include noncurrent lines or "rows" 46 (see FIG. 3). Referring to FIG. 1, the noncurrent rows would be the rows or records displayed for all but the third column of files or cards. Each record or card is shown only on one line in FIG. 1. The second parameter accepted is the noncurrent column width 48 (see FIG. 3). In the example shown in FIG. 1, this would again refer to the width displayed for columns 1, 2, 4, 5 and 6, and in the example is ten characters or pixels. The third parameter accepted is the current card width 50 (see FIG. 3). This parameter sets the width of a column in which the current card or file is located. In FIG. 1, this is illustrated by the ten character or pixel width of the third column, as reflected by the current card or file 18. Finally, the set parameter function determines the height of the current card 52. It will be shown in the following discussion that the current card or file 18 may have a larger display than the remaining cards in that file or column. In particular, reference to FIGS. 14 and 15 will show that the current record or card has been expanded to four lines, while the remaining cards or records are limited to two rows of data.

Once the parameters have been set, then the function adjust 40 is executed. It should be remembered that the function adjust 40 can be entered by any one of the four commands shown in the decision blocks 24, 26, 28 and 30 in FIG. 2, or directly from the "set params" function. The purpose of the function adjust 40 is to reset the "X" anchor and "Y" anchor and further to determine the first card or record to be displayed in each file or column based on the current card or record in that file. Function adjust first checks to see if the "X" or the "Y" anchor have exceeded the limits of the display device. In particular, decision block 54 checks to see if the "X" anchor of the current column plus the current column width is greater than the display width. If this is the case, then the "X" anchor is moved leftwardly on the display device so that the right side of the current column coincides with the right side of the display screen. If, on the other hand, the "X" anchor occurs to the left of the screen or is less than zero as indicated in decision block 56, then the "X" anchor for the current column is set at the lefthand edge of the display screen. Decision blocks 58 and 60 (see FIG. 4) perform the same function for the "Y" anchor, it should be remembered that "Y" increases in a downward direction as shown in FIG. 1. Operation block 62 determines the first card to be displayed in the current column. It should be remembered that at start-up time in the main loop a current card may be designated for each column. Knowing the current card or record, the "Y" anchor (which has also been established at initialization time) is divided by the noncurrent card lines with the dividend being subtracted from the current card number. The result will be the first record to be displayed in a column.

Following the determination of the first card to be displayed in the current column, the "X" anchor is set for the column numbers to the left of the current column as indicated in the loop 64. When the "X" anchor is determined to be less than zero as shown in loop 64, the routine drops out of loop 64 and passes on to the processing in FIG. 5 where the "X" anchors for the columns to the right of the current column are determined. When the "X" anchor exceeds the display width as shown in the decision block 66, the routine drops out of loop 68 and returns to the main loop shown in FIG. 2.

Figure 6:
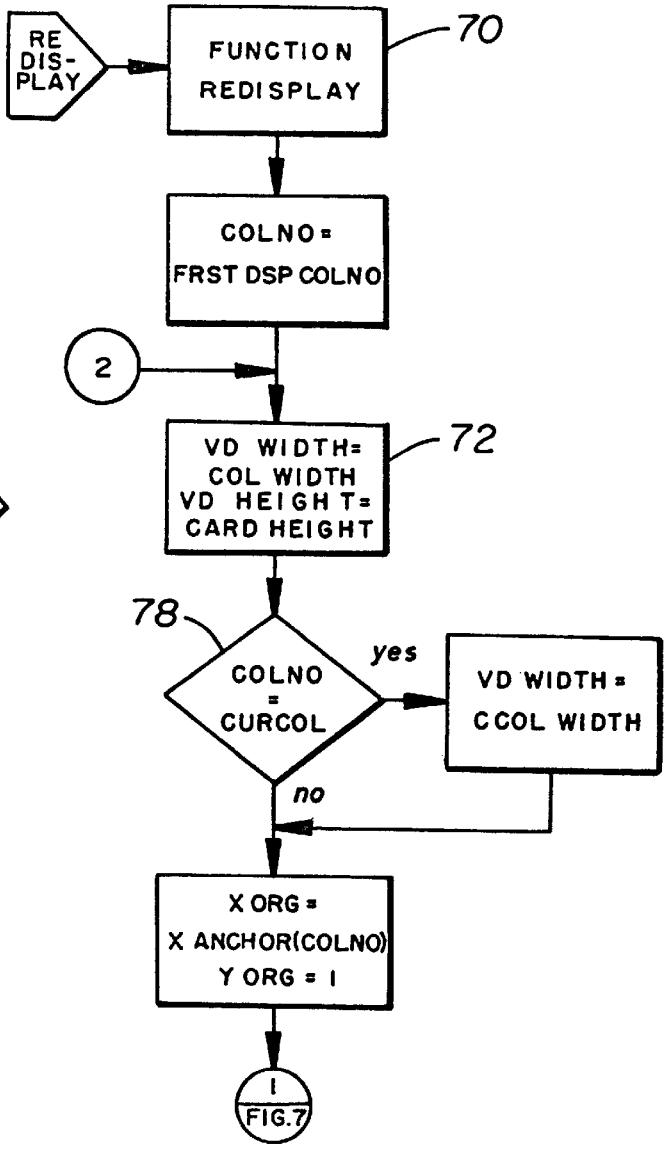

Returning now to FIG. 2, after the "set params" and "adjust" functions have been completed, the routine checks for another input character, if another character is sensed, then the routine just discussed would be re-executed. In addition to rearrangement of the broad display, the user can, as indicated above, select a "wide screen" or "zoom" for either a single file or column or a single record or card. However, if no character is sensed as coming from the input device, then the redisplay function 70 shown in FIG. 6 is performed.

Figure 7:
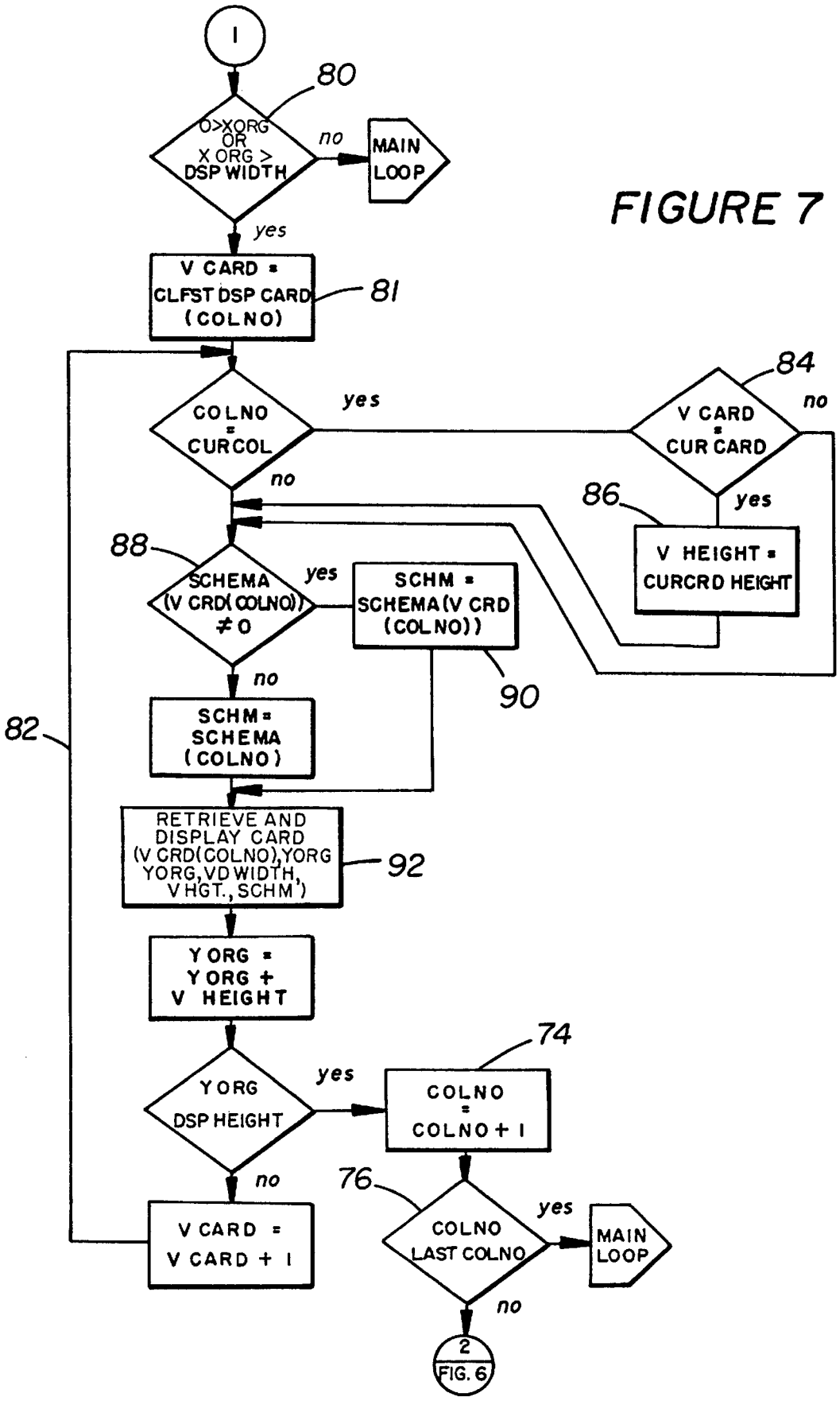

The purpose of the redisplay subroutine 70 is to continually refresh the display information on display device 14. It will be noted that redisplay function 70 starts at the lefthand or first display column or file as the case may be. The first file to be displayed on the screen has been determined in the function adjust loop 64 shown in FIG. 4, while the last column to be displayed is determined in loop 68 in a relatively straightforward manner. As can be seen, the redisplay function 70 is a series of nested loops with the first loop starting at operation block 72 in FIG. 6. In short, this loop 72 is repeated for each column or file to be displayed on display device 10. Reference should be made to FIG. 7, wherein the column is incremented in operation block 74 and returned to the entry point 2 in FIG. 6 if the column number has not exceeded the "last column number" as indicated in decision block 76 (see FIG. 6). This outer loop 72 sets the "X" origin or "X" anchor of the column number based on the parameter column width set during the set parameters function. In operation block 72, which starts this outer loop, the column width and card or record size heights are set with the parameter height and width for each column and record except the current column. If the column or file number is the current column as determined by decision block 78, then the viewed width is equal to the current column width. The "X" origin is set at the "X" anchor for the column number, while the "Y" origin is initialized at one.

Decision block 80 is one exit for the function redisplay. This exit occurs when the "X" origin is either less than zero or greater than the display width. When this occurs, the function redisplay is terminated and control is passed back to the main loop shown in FIG. 2.

The display process moves down the column or file record by record in a file starting with the first card to be displayed as determined in the function adjust, so that display for each card or record within the possible display parameters is accomplished. It should be noted that if the card or file to be displayed is the current card, then the viewed height of that card, as indicated in decision block 84 and operation block 86, may be corrected for current card height.

As mentioned early on in this discussion, if the schema for the particular file to be displayed differs from the card or file schema for the column, then decision block 88 comes into play, and the card or file schema is utilized in operation block 90 to lay out the particular pattern to be displayed for that card or record. This loop, which starts at decision block 88, is important to the concept of this invention because it places the control of the displayed pattern for a particular record or card as the case may be, directly in that record or card. In this invention, the display of any or all records is directly controlled or controllable through decision block 88 and the operation block 90. With this information, operation block 92, which would feed the overlying display program available in all microprocessors, will perform the function of providing to the microprocessor the necessary parameters for card or file to be displayed, including the specialized display parameters accepted in operation block 90. Ordinarily the schema is such that the initial fields of the record are preselected for display, however the ability to preselect other fields is provided.

As can be seen, what follows loop 82 are the incrementing functions of the "Y" origin and the card or record number for the column or file. If the "Y" origin is greater than the displayed height, then the column or file number is incremented and the program control is returned either to the beginning of the function redisplay at point 2 in FIG. 6, or the main loop if the column number is greater than the last column number.

In addition to implementing the start up with a display as shown in FIG. 1, one can also set the parameters so that a single column of cards or records will appear with only one line from each card. (As previously stated this may be the default or start up selection.) See FIG. 17. By selecting a "Full Card" (FIG. 2a) the display area will show the material illustrated in FIG. 16, that is all of the first or current card. (If the data contained in the first record exceeds the display screen then appropriate truncation, field abbreviation or both may be used.

If one should want additional columns then a second column may be selected. For example, if the display is as shown in FIG. 17, the selection of column 3 would cause the display area to be divided so that columns one and three would appear as in FIG. 19. It may also be appropriate to number the displayed columns as at 440 (see FIG. 19). Further the current column, in FIG. 19, may be highlighted on a CRT display by lighting the background and darkening the textual material. Selection of a third and subsequent columns would further divide the screen into thirds, fourths etc. It should be noted that in this option, it is preferred that one line from each card or record be displayed although the full record (with abbreviated text) may also be selected. The previously mentioned scrolling is particularly useful when abbreviated text is used.

Figure 2B:
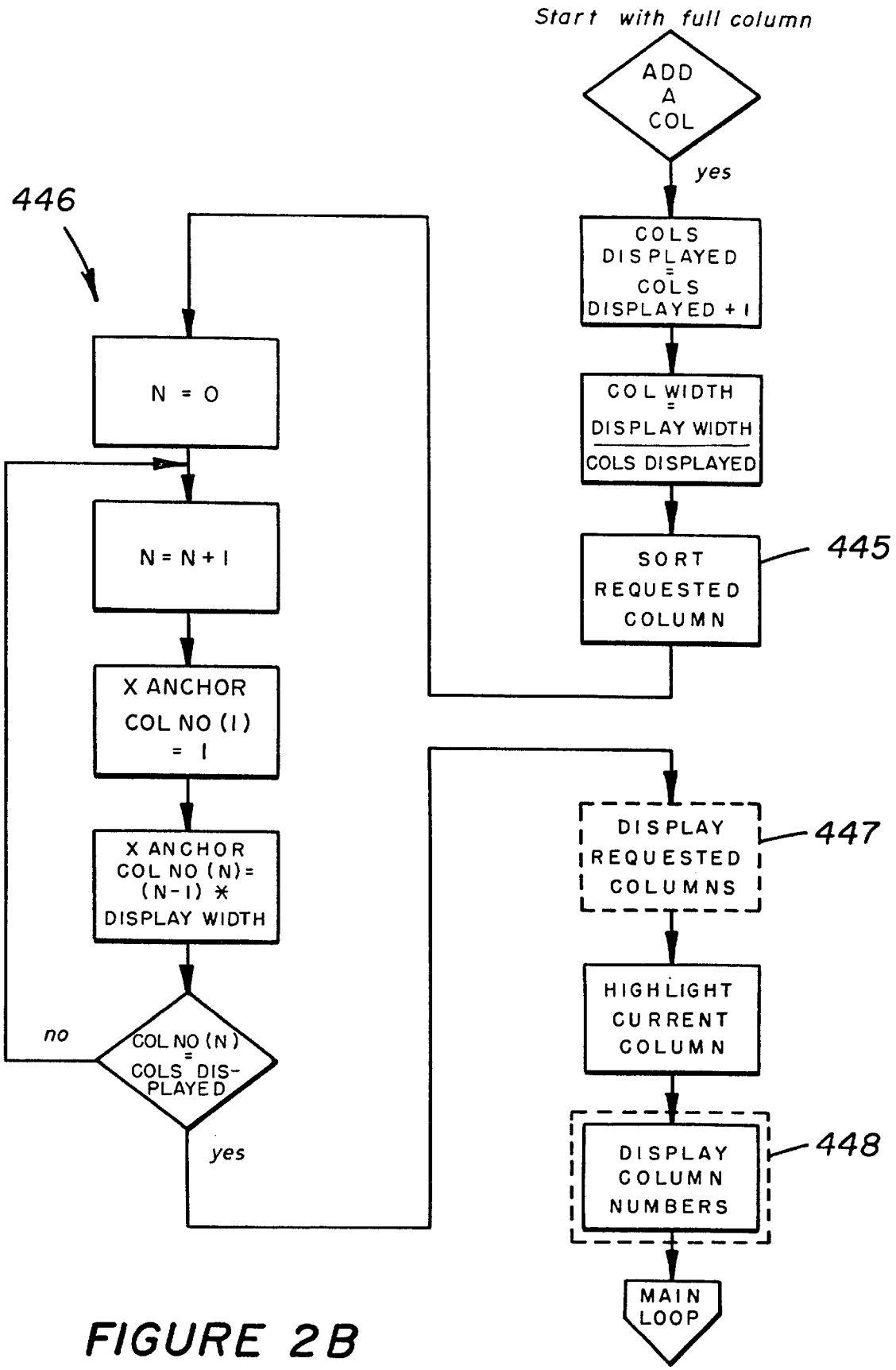
Figure 3:
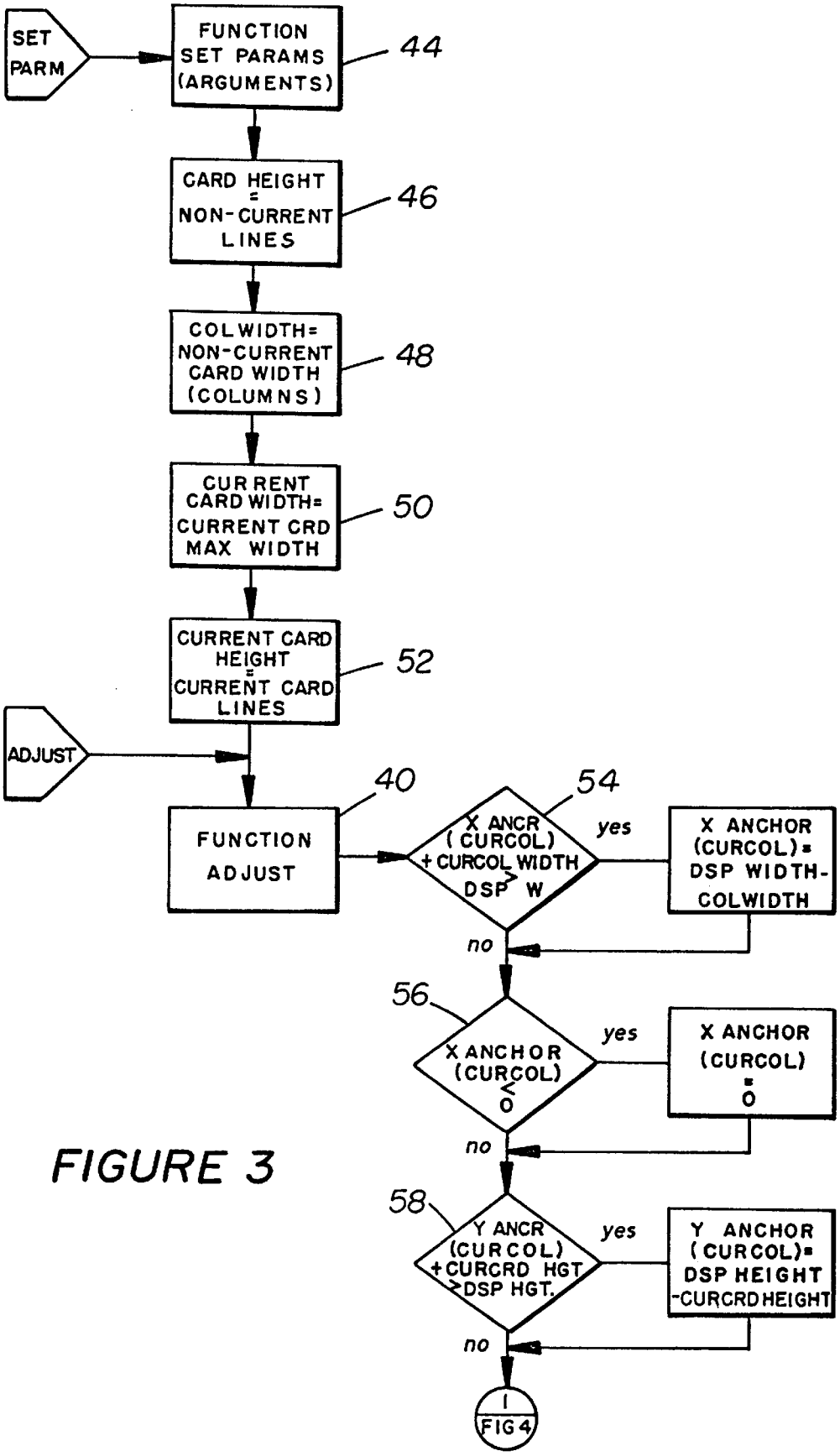
Figure 4:
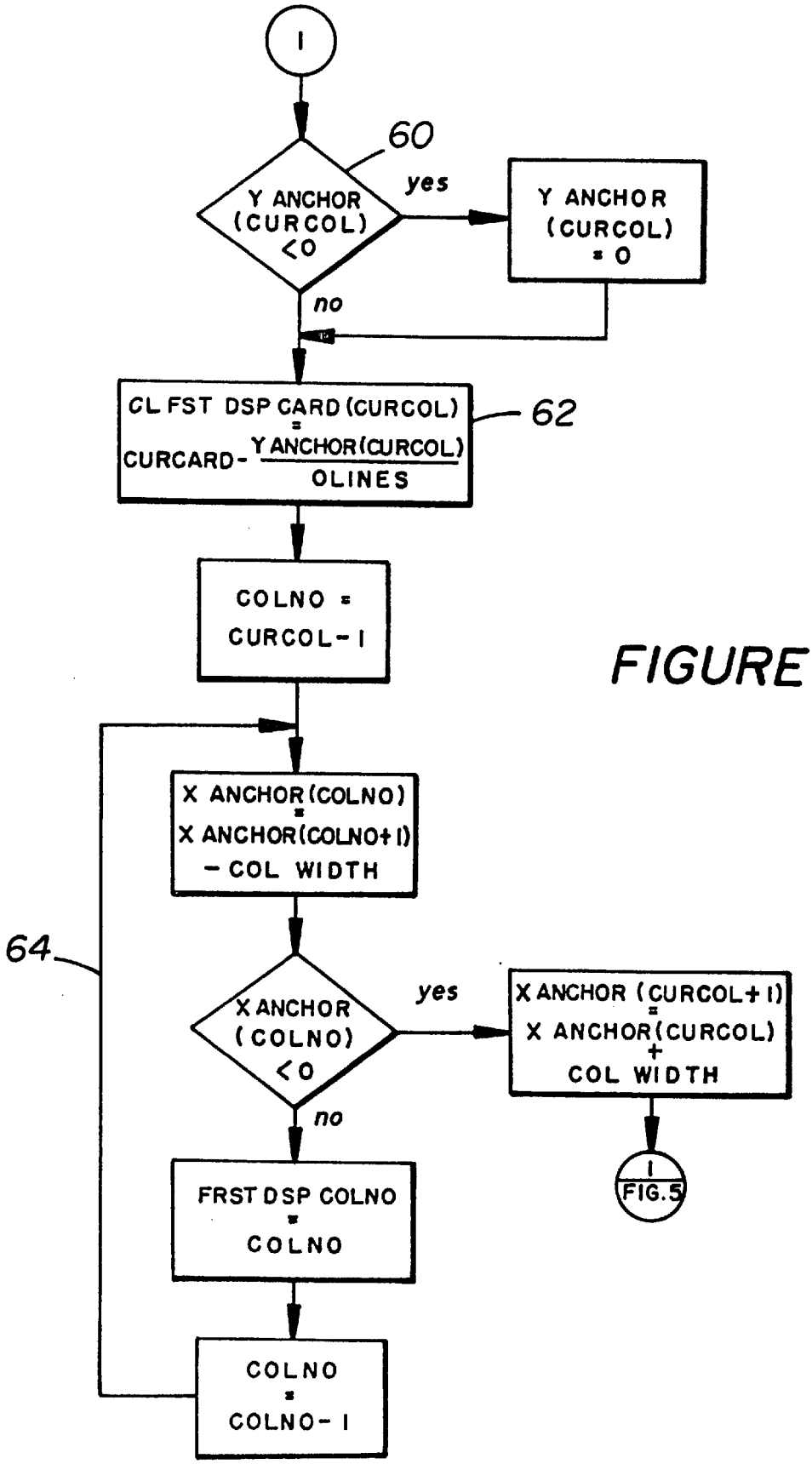
Figure 5:
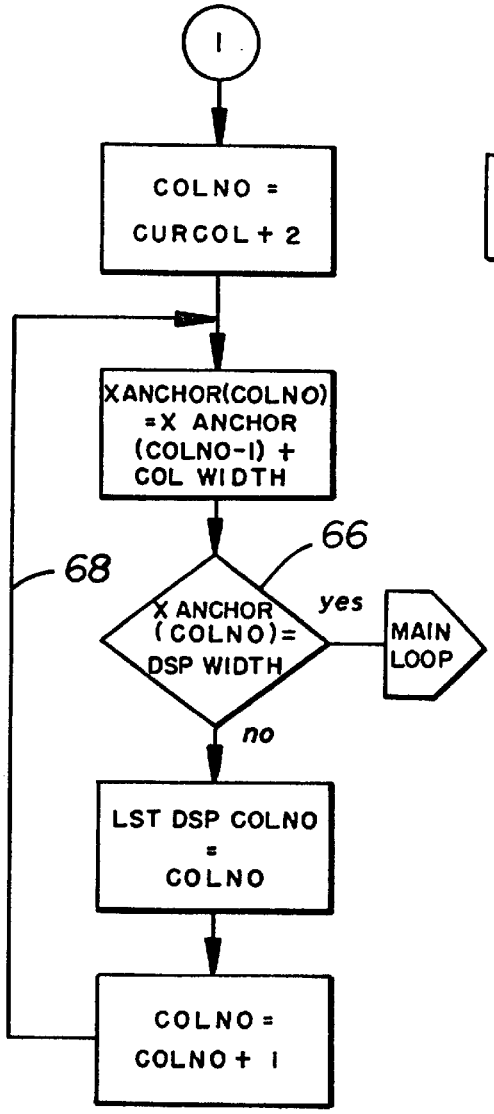
Figure 19:
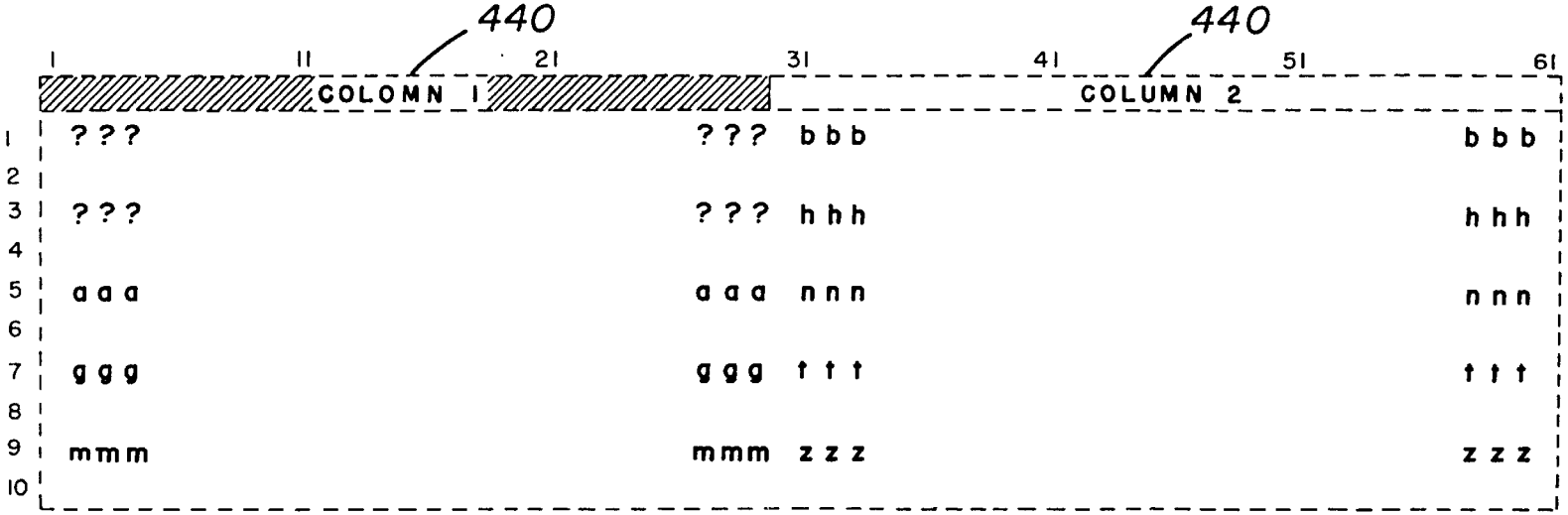
FIG. 19 is a representation of the first two columns of the display in FIG. 1 with column headings and blank lines.

The programming for adding a column is shown in FIG. 2B. Essentially what is done in the flow chart in FIG. 2B is to determine how many columns are to be displayed and then determining the appropriate X-anchor for each column. As important function of this "Add a Column" loop is the "sorting" of the columns. For example, after the user requested column 3 as shown in FIG. 19, the next request could be for a column that would be displayed to the left of column 3 (column 2) or to the right of column 3 (column 4 or higher). The program will "sort" the requested columns (operation block 445), determine the X-anchors (loop 446) and then display the requested columns. Options to highlight the current column and display column numbers are provided at blocks 447 and 448.

OPERATION OF THE PREFERRED EMBODIMENT

Again referring to FIG. 1, this display system is designed to operate on a portable microprocessor having a display device 14 and a data string input device in keyboard 15. It should be understood that keyboard 15 may be an integral part of the display device 14. Furthermore, the microprocessor could very well include provision for a printer or other hard-copy output device. It might be particularly appropriate to include both input and output by either tape or disk/diskette devices so that the small microprocessor (note pad size computer) can be loaded from a larger, more permanent installation, and further the "note pad" computer can be off-loaded to the same larger type of installation.

Previous attempts at providing a limited display capability for one or more records in a series of files have generally revolved around the physical layout or desired format of physical records so that unabbreviated or untruncated portions of those formatted records are available for perusal by the user. This invention overcomes that drawback by providing scanning capability to the user and further capability to display various sized portions of the records contained in the various files. In short the detail level of the display or "zoom" size is in the users hands.

Referring to FIG. 8, a typical record is indicated as an "r" line, "s" column matrix. Located in the record shown in FIG. 8 is an indication 92 as to whether there is a special display schema associated with that particular record. This indication may be in the form of a single bit flag so that reference to the schema will either be to the card or record schema or to the column or file schema. It should be understood that the record displayed in FIG. 8 is representative only. It should also be understood that this record can be considered as being a string of data elements with a variable length less that "t." This variable length string may have identifiable fields $f_1$ through $f_m$ each of which may be considered lines "a" through "m." If a field exceeds a line length, it will continue on the next "line." If two or more fields can be displayed within a fixed length display line then they may be so displayed.

Each file is composed of a series of independent strings $[t_1, t_2 \ldots t_m]$ $S_1, S_2 \ldots S_K \ldots S_N$, each string comprising a card or record. Thus, as indicated in FIG. 9, there are files 1, 2, 3 . . . N with each file having up to "M" records, and each record having up to $f_m$ identifiable fields.

In the examples shown in FIGS. 10, 11, 12, 13, 14 and 15, the material displayed refers to the display first shown in FIG. 1. Specifically, in FIG. 1, an m×n matrix of records is shown with the specific records starting in column 2, at row 3 with record "a" and running through column 7 row 5 with record "ad." For purposes of this discussion, the display 14 shown in FIG. 1 has eleven lines of pixels and sixty-one columns of pixels. The viewboards or parameters have been preset so that six columns of five records can be displayed. The first cards or records displayed are as indicated in the display device 14, that is, a, b, c, d, e and f, while the current cards for the respective columns are m, n, o, p, w and ad. For the display shown in FIG. 1, the parameters have been set with the non-current lines having one line of characters or pixels, the noncurrent columns having ten characters or pixels, and the current column also having ten columns of characters or pixels. The current card, which in the display shown in FIG. 1 is the "o" card or record, is set for one line of characters or pixels. If the parameters are changed to 2, 10, 10 and 2 (2 noncurrent lines, 10 noncurrent columns, 10 current columns and 2 current card lines), the display shown in FIG. 10 occurs. In this instance, it will be noted that the "a" and the "y" records in the first column have disappeared from the display device because of the enlargement of the remaining cards or records to two lines of data. It should be understood that, for convenience's sake, a line is skipped in between each record and a column is skipped in between each file. This need not necessarily be the case; however, for convenience and clarity it has been done in this manner in this particular discussion.

Figure 10:
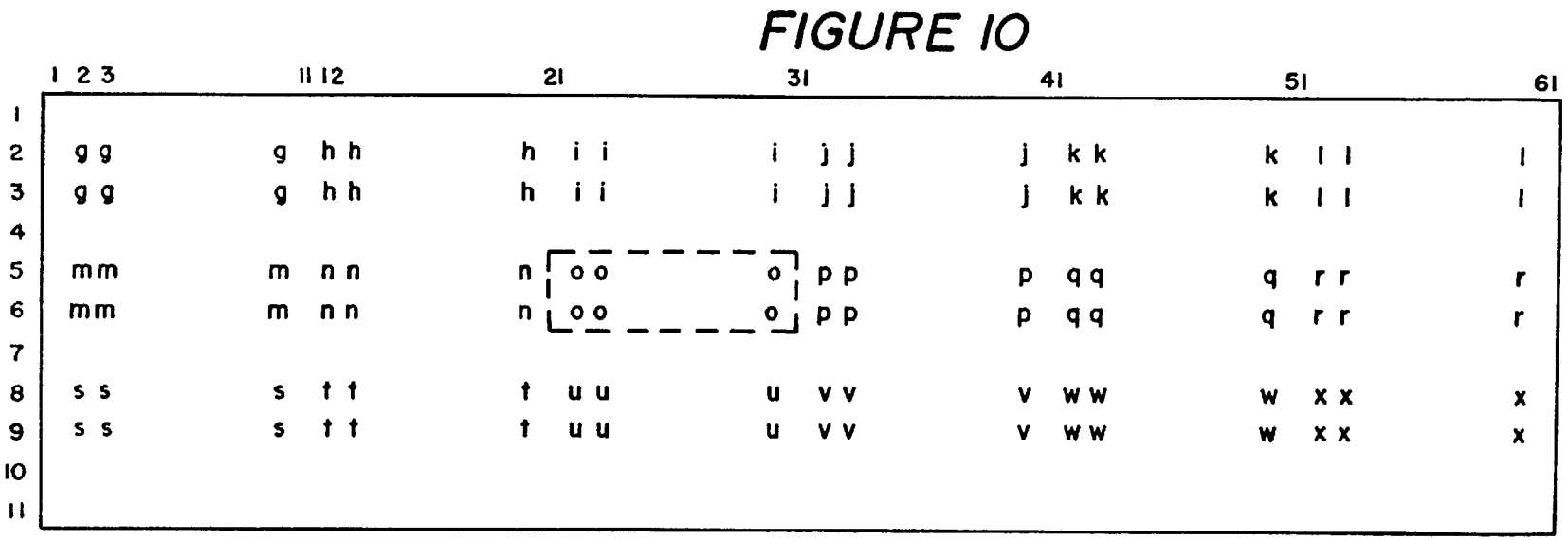
FIG. 10 is a representation of the display shown in FIG. 1 after an adjustment has been made to the record/file/files parameters.
Figure 12:
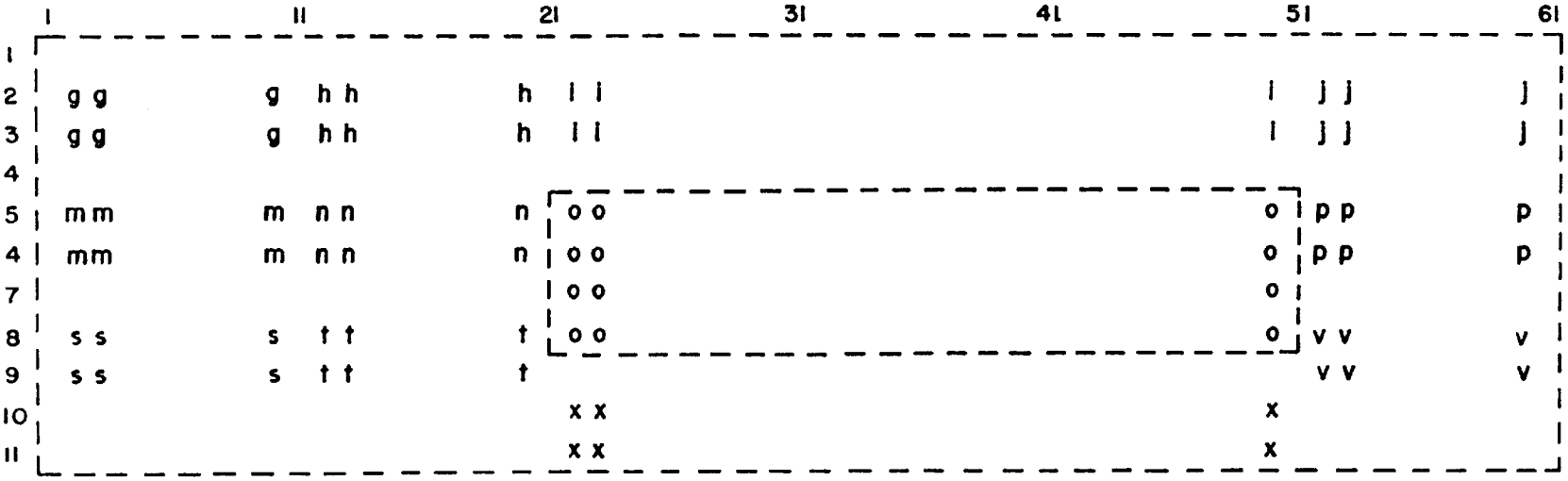
FIGS. 12, 13, 14 and 15 are similar changes in the display representation after subsequent parameter changes.

If the schema of card or record "o" differs from the schema of the column, then the identifiable fields in record "i" may well differ from the identifiable fields in record "o." For example, if the third file is comprised of addresses and names of organizations, it may be appropriate in certain ones of those records to indicate an idiosyncrasy of an individual associated with that organization. Thus, the schema of card "o" may well represent that idiosyncrasy at the expense of losing some other intelligence shown for other records in that file. That intelligence could be regained by selecting one of the other parameters so that additional rows or pixels are displayed, by changing the record schema or by "scrolling." This is illustrated in FIG. 12 where the "o"th card or record has been expanded to four rows of pixels and thirty columns of pixels. Simultaneously, the parameters for remaining cards or records in the display remain at two rows and ten columns for the noncurrent rows and columns, but the columns for the current column, that is, the third column, are all expanded to thirty characters or pixels. The difference that occurs between the display shown in FIG. 1 and the display shown in FIG. 10 is a result of a change in parameters and takes place in the set parameter function 44. Similarly, the difference between the display shown in FIG. 11 and FIG. 10 occurs with a difference in the set parameter function, namely, the number of columns is increased to thirty in the current column routine.

Figure 13:
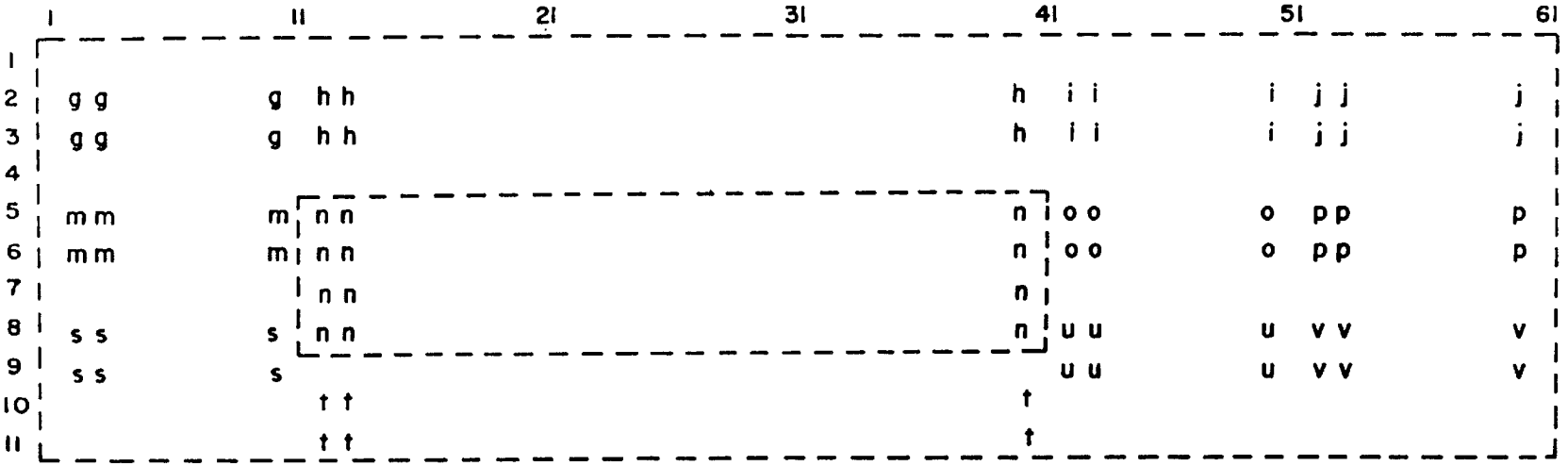

FIG. 13 is a result of a left arrow command as shown in decision block 26 of the named loop. In this instance, the current card shifts from the third column, specifically the "o" record to the second column, where the "n"th record has been predesignated as the current card. It may be remembered that the "n"th record was the current card in the second column. Thus, a shift from the current card in the third column to the current card in the second column results in an expansion of the "n"th record to four lines by thirty columns as shown in FIG. 13.

If the current card is shifted downwardly (see FIG. 14), as shown in decision block 30 from the "n"th record, the "n"th record is then reduced to two lines of pixels and the "t"th record is increased to four lines of pixels.

Figure 15:
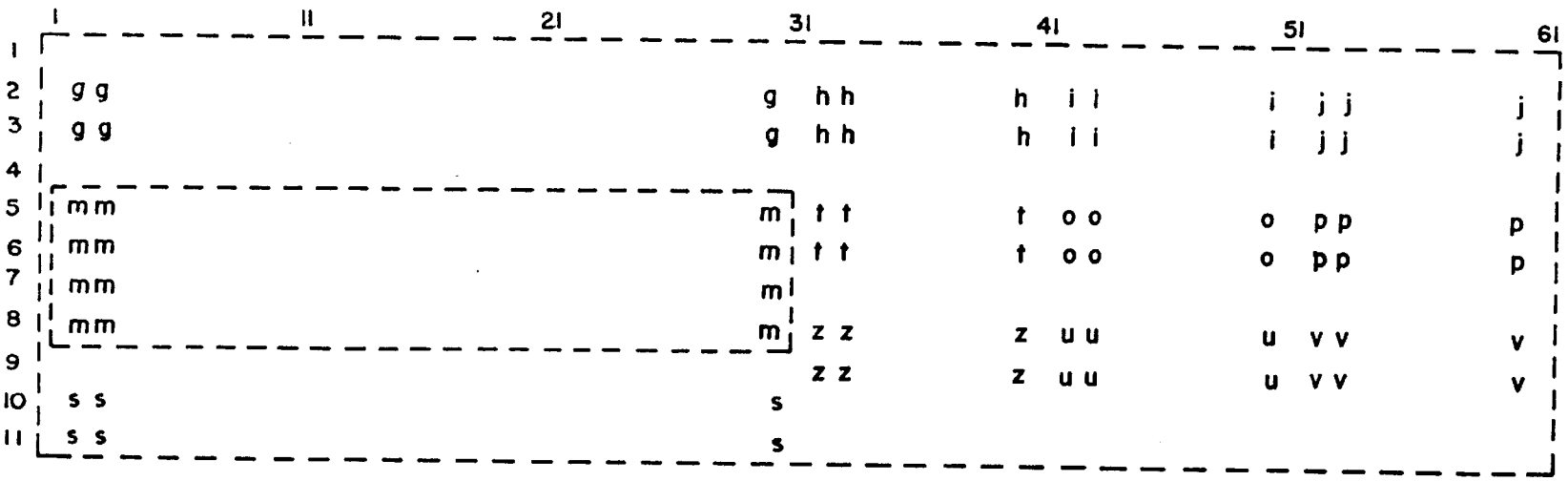

If the left arrow is again selected as indicated in decision block 26 from FIG. 12, the current column is shifted from the second column to the first column (see FIG. 15). When the current column is shifted to the first column, it should be remembered that the current card in the first column was the "m"th card. Thus, the "m"th card will be expanded to four lines of pixels with thirty columns of pixels. In shifting from the second column where the "t"th record was designated to the first column where the "m"th record had been designated the current card, the display shown in FIG. 15 occurs. In FIG. 14 and FIG. 15, it should be particularly pointed out that a shift downwardly in the second column from the "n"th to the "t"th record will place the current card in the second column in the center position because of the location of "y" anchor. It should be noted that the current card in the third column, or the "o"th record remains in the central position since the current card is "anchored" by the original "x" anchor and "y" anchor which had been entered in the initialization program at row 5 and column 22. It is the "y" anchor that determines the position of the current card in the column. Thus, the "o"th card remains in the center position while the "t"th card takes on that position in FIG. 15, rather than the "n"th card.

In order to obtain the single column situation depicted in FIG. 16, a code can be used or the parameters set to 0, 0, 60, 1 so that there are no non current columns, no non current lines, 60 current columns (the display width column) and one current line (the display height/card). In order to add a new column of cards, using the logic of FIG. 2B, one merely selects the desired column and the "current columns" are reduced accordingly. Moving back to the single column may be done with one keystroke if coded or by resetting the parameters.

It can be seen that this program permits the user to not only control the display of the cards, but also move from one record to the next record with a great deal ease.

While this invention has been shown in relation to a particular embodiment, it should not be considered so limited. Rather, it is limited only by the appended claims.

What is claimed is:

1. In an interactive data entry computer system [wherein] *including* a [user is presented with a] data [entry] display screen[, a data string] *for displaying data in horizontal lines, an* input device, a processor, *and* a storage device for storing [$S_n$] *n* independent strings of data elements [each string $S_k$ of variable length less than t] *comprised of alphanumeric characters where n is a positive integer greater than one*, each [string $S_k$ having at least one data field $f_i$ and an output device, said independent strings $S_1$ through $S_n$ classifiable into groups, each group having strings with at least one similar filed, a data retrieval and display system comprising:

processing means for locating each stored independent string of data;

control means for preselecting and simultaneously displaying on the data entry display screen or output device portions of a first independent string $S_1$ of data and portions of a second independent string of data $S_2$ said first string preselected portions having a displayed] *said string $S_k$ of* length [$l_1$] *less than t characters where t is a positive integer, k is a positive integer less than or equal to n, each said string $S_k$ having data fields $f_i$ where I is a positive integer less than or equal to F and F, the number of fields, is a positive integer greater than or equal to two, said independent strings $S_1$ through $S_n$ classified into groups, each said group having strings with at least one similar data field, a display screen comprising:*

[less than t; said second string preselected portions having a displayed length $l_2$ less than or equal to $l_1$, and said first and second strings being in the same group, whereby the user is simultaneously presented with two or more portions of different] *fetching means in communication with said storage device for locating each stored independent string $S_k$;*

*display means operative in a first mode for displaying said strings in a certain display area on said* data [strings] *display screen, said certain display area including a first display area of length $l_1$ characters less than t, said first display area providing for the display of a plurality of lines, and a second display area of length $l_2$ characters less than or equal to $l_1$, said display means in response to an input from the input device for actuating said fetching means and said display screen for simultaneously displaying on the data display screen within said first display area portions of a plurality of fields of a first independent string $S_1$ each in a specified position on said lines within said first display area so that portions of a plurality of said fields of said string $S_1$ can be displayed on one line of said first display area, further wherein only one instance of each portion of a field is displayed within said certain display area in said first mode, and portions of fields of a second independent string $S_2$ within said second display area wherein said display means removes at least one character from one of said fields of said string $S_1$, said display means including full field display means operative in a second mode of said display means responsive to an input received from said input device for displaying all the characters of the field from which said at least one character was removed within said certain display area while maintaining the display of at least some of said portions of said string $S_1$ displayed in said first mode and at least*

*some of said portions of said string $S_2$ displayed in said first mode with said displayed portions of strings $S_1$ and $S_2$ displayed in the same positions as displayed in said first mode whereby a user is simultaneously presented with portions of two or more different data strings.*

2. The system of claim 1 further including *a third display area within the certain display area of length $l_3$ less than or equal to $l_1$ wherein said string $S_1$ is in a first group and further wherein said display means includes* means for displaying [a preselected portion of an additional independent data] *portions of preselected fields of a third* string $S_3$ from a [different] *second* group *within said third display area* simultaneously with the [preselected portions] *portions of the preselected fields* of data strings $S_1$ and $S_2$[, said additional string $S_3$ having a displayed length $l_3$ equal to or less than $l_1$].

3. The system of claim 1, *2, 6, 7, 9, 12, 15, 18, 20, 23, 26, 33, 43, 54, 76, 80, 81, 82, 84, 85, 86, 87, 90 or 91* wherein the *display means includes sorting* means for [simultaneously] displaying [on the output device a preselected portion of string $S_1$ and a preselected portion of string $S_2$ is respectively] *said portions of said preselected fields of string $S_1$ and string $S_2$ in an order* responsive to [at least one field $f_i$ contained in string $S_1$ and at least one field $f_j$] *a content of some field $f_s$ contained in string $S_1$ and a content of a similar field $f_s$* contained in string $S_2$.

[4. The system of claim 3 wherein the preselected fields $f_i$ and $f_j$ are respectively the first fields of string $S_1$ and $S_2$].

5. The system of claim [1] *24* wherein the *display means includes* means for simultaneously displaying on the [output device] *display screen said portions of said* preselected [portions] *fields* of strings $S_1$ and $S_2$ [is] *at locations on the display screen* responsive to *a content of* at least one field [$f_k$] *$f_s$* contained in a *third* string [$S_s$] *$S_3$* classified in the same group as *strings* $S_1$ and $S_2$.

6. The system of claim [3 wherein the] *1 further including* means [for simultaneously displaying on the output device preselected] *responsive to the input device for accepting display size dimensions and using said display size dimensions to determine new values of $l_1$ or $l_2$ so that shorter or longer* portions of [strings $S_1$ and $S_2$ includes means for accepting display size dimensions from the data string input device, said display size dimensions useable for determining] the [display area] *fields* of strings $S_1$ and $S_2$ *than those displayed within the first and second display areas are displayed within resized first and second display areas.*

7. The system of claim 1 further including means for editing [strings $S_1$ and $S_2$ while] *field $f_i$ of strings $S_1$ and $S_2$ when said* portions of *said preselected fields of strings* $S_1$ and $S_2$ are displayed.

[8. The system of claim 1 further including means for highlighting the display of the preselected portions of data string $S_1$].

9. The system of claim [2] *1 wherein said display means is operative in a card mode in response to the input device for actuating said fetching means and preselecting and displaying expanded portions of said data string $S_1$ in an area of length $l_i$ greater than $l_1$ and* further including means [for preselecting portions of data string $S_1$ such that the length $l_1$ of the preselected portions data string $S_1$ is greater than either $l_2$ or $l_3$, the displayed lengths of the preselected portions of data strings $S_2$ and $S_3$ respectively] *in response to the input device for restoring the original display length $l_1$.*

[10. The computerized data system of claim 2 wherein the output device is a video device having a display area capable of displaying in the display area at least r lines of pixels, each line having s pixels; the data retrieval and display system further including means for displaying in the display area on the output device the preselected portions data string $S_1$ on lines I through h and for displaying the preselected portions of data string $S_2$ on lines i through r where r is greater than 2.]

[11. The system of claim 10 further including means for displaying on the output device the preselected portions of data strings $S_1$ and $S_2$ in the leftmost j pixels of the output device where j is less than s and the preselected portions of data string $S_3$ on lines l through h in the remaining rightmost s-j pixels of the output device.]

12. The system of claim [11 further including means for simultaneously displaying the preselected portions of data] *1 including wherein said display means is operative in a card mode in response to a single command from said input device for actuating said fetching means and displaying expanded preselected portions of said string $S_1$ on said display screen, said system including means for restoring the display of the prior portions of* strings $S_1$[,] *and* $S_2$ [or, in response to a single command displaying only preselected portions of data string $S_1$].

13. The system of claim [12] *24* wherein the [preselected portions of data string $S_1$, $S_2$ and $S_3$ are displayed in a truncated format] *display means includes means for expanding an area of display for a portion of a field $f_i$ of string $S_1$ so that the expanded area suppresses the display of another portion of the string $S_1$.*

[14. The system of claim 13 wherein the preselected portions of data string $S_1$ consists of fields $f_1$ through $f_j$, where each field $f_i$ through $f_j$ has a name associated with it, the system including means for displaying at least one field $f_h$ of the truncated displayed fields in its full form preceded by the field name, the full field display occurring sequentially with the name followed by each character of the field moving across the display area from right to left in the area allocated to the truncated field.]

15. The [data retrieval] system of claim 1 wherein [said] *a portion of some* preselected [portions include one or more fields] *field* $f_i$ [and each field $f_i$ is abbreviated] *of string $S_1$ displayed on the display screen constitutes a sequence of at least two characters which are noncontiguous in the field $f_i$.*

16. The [data retrieval] system of claim 1, *2, 6, 7, 9, 12, 15, 18, 20, 23, 26, 33, 43, 55, 76, 80, 81, 84, 85, 86, 87, 89, 90 or 91* wherein [each field $f_i$ through $f_m$] *field $f_i$ of said string $S_1$* has a name associated with it, *said name stored in said storage device,* the system further including:

*name display* means *operative in a first mode for displaying field $f_i$ without its said name within said certain display area;*

*and operative in a second mode* for retrieving [and displaying at least one of said names] *from said storage device, said name and displaying said field $f_i$ with its said name within said certain display areas; and,*

*means responsive to said input device for switching between said first and second mode.*

[17. The data retrieval system of claim 16 wherein said preselected portions include one or more fields $f_i$ and each displayed field $f_i$ is abbreviated.]

18. The [data retrieval] system of claim 1 wherein said displayed [preselected portions occupies] *portions of said preselected fields of strings $S_1$ and $S_2$ occupy* a portion of the [output device the system] *data display screen; and the display means* further [*including includes* means for alternatively displaying [the said preselected portions or a single data string] *said portions of data string $S_1$* on the [output device] *data display screen while suppressing the display of string $S_2$* upon a signal from the input device.

[19. The data retrieval system of claim 1 including means to classify data strings having identical data fields.]

20. In an interactive data entry computer system [where] *including a data display screen, an input device, a processor, and a storage device for storing n independent strings of data elements comprised of alphanumeric characters, where n is a positive integer greater than one, each said string $S_k$ of length less than t characters where t is a positive integer, k is a positive integer less than or equal to n, each said string $S_k$ having data fields $f_i$, where I is a positive integer less than or equal to F and F,* the [user is presented with a data entry display screen, a data string input device, a processor, a storage device for storing $S_n$ independent strings of data elements each string $S_k$ of variable length less than t, each string $S_k$ having at least one data field $f_i$, and an output device, said independent strings $S_1$ through $S_n$ classifiable into groups, each group having strings with at least one similar field, a data retrieval and display system comprising;

processing means for locating each stored independent string of data;

first control means for preselecting and simultaneously displaying] *maximum number of fields, is a positive integer greater than or equal to two, said independent strings $S_1$ through $S_n$ classified into groups, a display system comprising:*

*fetching means in communication with said processor and said storage device for locating each said stored independent string $S_k$;*

*display means operative in a rack mode for displaying said strings* on [the output device portions of a first independent string $S_1$ of data and portions of a second independent string of data $S_2$, said first string preselected portions having a displayed length $l_1$ less than t; said second string preselected portions having a displayed length $l_2$ less than or equal to $l_1$, said first and second string from the same group; and second control means for alternatively only displaying preselected portions of data string $S_1$, whereby the user is simultaneously presented with two or more portions of different data strings] *said data display screen, said display means operative in said rack mode in response to an input from the input device for actuating said fetching means and for simultaneously displaying a portion of at least one preselected field of a first string $S_1$ within a first display area within a certain display area of said display screen said certain display area having a plurality of lines, and a portion of at least one preselected field of a second string $S_2$ within a second display area within said certain display area;*

*said display means including means operative in said rack mode for arranging said displayed portions of said preselected fields of strings $S_1$ and $S_2$ in accordance with a display format;*

*said display means operative in a first card mode in response to an input from the input device for actuating said fetching means and for only displaying expanded portions of said string $S_1$ within said certain display area said expanded portions comprising a plurality of fields each of said fields in a specified position on said lines of said certain display area so that portions of at least two of said plurality of fields can be displayed on one line of said certain display area and further wherein only one instance of each said portion of a field is displayed within said certain display area in said first card mode, wherein said display means includes means operative in the first card mode of display for removing at least one character from at least one of said fields of said string $S_1$ said display means further including full field display means operative in a second card mode of said display means, responsive to an input received from said input device, for displaying within said certain display area all the characters of said one of said fields from which a character was removed within said certain display area while maintaining the display of portions of other fields of said string $S_1$ displayed in said first card mode with said displayed portions of string $S_1$ displayed in the same positions as displayed in said first card mode of display, whereby additional characters of said string $S_1$ not displayed in said rack mode are displayed in said first card mode, and additional characters of said string $S_1$ not displayed in said first card mode are displayed in said second card mode; and*

*means for switching between the card mode and rack mode of said display means without changing said display format for the rack mode display.*

[21. The system of claim 20 wherein the strings $S_1$ and $S_2$ include one or more data fields $f_i$ and further wherein the data fields $f_i$ are truncated when displayed with the first control means and not truncated when displayed with the second control means.]

[22. The system of claim 20 wherein the preselected portions of data string $S_1$ consists of fields $f_1$ through $f_j$, were each field $f_i$ through $f_j$ has a name associated with it, the system including third control means for displaying at least one field $f_h$ of the truncated displayed fields in its full preceded by the field name, the full field display occurring sequentially with the name followed by each character of the field moving across the display area from right to left in the area allocated to the truncated field.]

23. The system of claim [22 wherein the preselected portions of data string $S_1$ consists of fields $f_i$ through $f_j$, where each field $f_i$ through $f_j$ has a name associated with it, and further wherein the third control means further includes means to display the field $f_h$ in its full text mode along with its associated name when the preselected portions of string $S_1$ are displayed by the second control means] *20 further including expanded field display means for actuating said fetching means and said display screen to display an expanded form of some field $f_z$ in string $S_1$.*

*24. In an interactive data entry computer system including a data display screen for displaying data in horizontal lines, an input device, a processor, and a storage device for storing n independent strings of data elements, said data elements comprised of alphanumeric characters where n is a positive integer greater than one, each said string $S_k$ of length less than t characters where t is a positive integer, k is a positive integer less than or equal to n, each said string $S_k$ having data fields $f_i$ where I is a positive integer less than or equal to F, and F, the number of fields, is a positive integer greater than or equal to two, said strings $S_1$ through $S_n$ classified into groups, each said group having strings with at least one similar field strings $S_1$ and $S_2$ having different schemas associated with them, said schemas stored in said storage device and used to specify formatting information for specifying the position of portions of said strings $S_1$ and $S_2$ individually for each said field, a display system comprising:*

*fetching means in communication with said processor and said storage device for locating each stored string $S_k$; and,*

*display means operative in a first mode for displaying said string $S_1$ in a first display area of length $l_1$ and said*

*string $S_2$ in a second display area of length $l_2$ in a certain display area on said data display screen, said first and second display areas each comprising a plurality of lines, said display means responsive to an input from the input device for actuating said fetching means and displaying in said first display area of said certain display area portions of a plurality of preselected fields of said first string $S_1$ in accordance with said schema associated therewith, said portions comprising portions of a plurality of fields each in a specified position on said lines of the first display area so that a plurality of fields can be displayed on one line of the first display area further wherein only one instance of each portion of a field is displayed within said certain display area and displaying within said second display area of said certain display area portions of preselected fields of said second string $S_2$ in accordance with said schema associated therewith, wherein said display means includes means for removing at least one character from one of said fields of said string $S_1$ said display means including full field display means operative in a second mode of said display means responsive to an input received from said input device for displaying all the characters of said field from which said at least one character was removed on one of said lines within said certain display area while maintaining the display of portions of other fields of said string $S_1$ displayed in said first mode, with said displayed portions of said string $S_1$ displayed in the same positions as displayed in said first mode.*

*25. In an interactive data entry computer system including a data display screen having a certain length for displaying data in horizontal lines, an input device, a processor, and a storage device for storing n independent strings of data elements comprised of alphanumeric characters where n is a positive integer greater than two, each said string $S_k$ of length less than t characters where t is a positive integer, k is a positive integer less than or equal to n, each said string $S_k$ having data fields $f_i$ where I is a positive integer less than or equal to F, and F, the maximum number of fields, is a positive integer greater than or equal to two, said independent stings $S_1$ through $S_n$ classified into groups, each said group having stings with at least one similar field, a display system comprising:*

*fetching means in communication with said processor and said storage device for locating each said stored independent string $S_k$;*

*display means for displaying said strings in a certain display area on said data display screen, said certain display area including a first display area of width $w_1$ characters and height $h_1$ characters within said data display screen and a second display area of width $w_2$ characters and height $h_2$ characters within said data display screen, said display means responsive to an input from the input device for actuating said fetching means and said display screen for simultaneously displaying on the data display screen portions of preselected fields of a first independent sting $S_1$ within said first display area and portions of preselected fields of a second independent string $S_2$ within said second display area wherein said display means removes at least one character from said string $S_1$ to generate said portions of said preselected fields of said string $S_1$, each of said portions of preselected fields of said string $S_1$ having a displayed length $D_i$, whereby a user is simultaneously presented with portions of two or more different data strings; and,*

*means for changing the width $w_1$ and while holding the height $h_1$ constant in response thereto for automatically adjusting only the display length of the fields of said string $S_1$ by adjusting the displayed length $D_i$ of at least two of said preselected fields of said string $S_1$ so that at least one alphanumeric character in each of said at least two preselected fields is displayed and so that some portion of all of said preselected fields of said string $S_1$ continue to be displayed whereby a user is presented with portions of a plurality of different data strings the displayed length of whose fields increase or decrease conjointly.*

*26. In a process executed in a computer with a data display screen and strings of alphanumeric characters stored in one or more files, a method for displaying the strings in an area of the data display screen allocated to the process for display, said allocated area containing a first display area comprised of a plurality of lines, each said string having a plurality of fields of alphanumeric characters, comprising the steps of:*

*(a) fetching first and second strings from said one or more files;*

*(b) simultaneously displaying on the data display screen portions of a plurality of preselected fields of the first string at a specified position on said lines so that portions of a plurality of fields are displayed on one line of the first display area, further wherein only one instance of each portion of a field is displayed within said first display area of the allocated area and portions of preselected fields of the second string within a second display area within the allocated area wherein at least one character is removed from one of said fields of the first string to generate one of said portions of the first string and,*

*(c) in response to input from an input device displaying within said allocated display area all of the characters of said field from which a character was removed while maintaining the display of at least some portions of said first and second string displayed in the same positions as displayed in step (b).*

*27. In a process executed in a computer with a data display screen capable of displaying data in horizontal lines and strings of alphanumeric characters stored in one or more files, a method for displaying the strings in an area of the data display screen allocated to the process for display, said allocated area having a plurality of lines, each said string having fields of alphanumeric characters, comprising the steps of:*

*(a) fetching first and second strings from said one or more files;*

*(b) simultaneously displaying in a first rack display mode a portion of at least one field of the first string within a first display area of the allocated area and a portion of at least one field of the second string within a second display area of the allocated area, the first and second display areas arranged according to a display format and within a rack display area of said allocated area;*

*(c) in response to a user input to the computer displaying expanded portions of the first string in a second card mode of display within the allocated area so that additional characters of the first string not displayed in the first display mode of step (b) are displayed said first string displayed within a card display area of the allocated area and comprising a portion of a plurality of said fields of said first string each in a specified position on said lines so that portions of a plurality of*

*fields can be displayed on one line of the allocated area wherein only one instance of each portion of a field is displayed within said allocated area said portions obtained by removing at least one character from one of said fields of said portions displayed on one of said lines;*

(*d*) *in response to input from an input device displaying within said allocated area all the characters of said one of said fields from which a character was removed while maintaining the display of other portions of said first string displayed in the same positions as displayed in step* (*c*);

(*e*) *in response to a user input to the computer switching between the first and second modes of display.*

*28. In a process executed in a computer with a data display screen capable of displaying data in horizontal lines and strings of alphanumeric characters stored in one or more files, a method for displaying the strings in an area of the data display screen allocated to the process for display said allocated area comprising a plurality of lines, each said string having a plurality of fields of alphanumeric characters, comprising the steps of:*

(*a*) *providing a separate schema for each of first and second strings in said one or more files, said schemas individually specifying formatting information including the position to display portions of each said field of the first and second strings;*

(*b*) *fetching said first and second strings from said one or more files;*

(*c*) *displaying in said allocated area on said data display screen portions of a plurality of preselected fields of the first string in accordance with said schema associated therewith, said portions comprising portions of a plurality of said fields of said first string, each in a specified position on said lines of a first display area of the allocated area so that a plurality of portions of said fields can be displayed on one line of the first display area further wherein only one instance of each said portion of a field is displayed within said allocated area and removing at leas one character from a field of the first string*

(*d*) *in response to input from an input device, displaying all the characters of the field from which a character was removed for display while maintaining the display of other portions of said string, with said displayed portions of said first string displayed in the same positions as displayed in step* (*c*); *and,*

(*e*) *displaying portions of preselected fields of the second string in a second display area of the allocated area in accordance with the schema associated with the second string.*

*29. In a process executed in a computer with a data display screen and strings of alphanumeric characters stored in one or more files, a method for displaying the strings in an area of the data display screen allocated to the process for display each said string having one or more fields of alphanumeric characters, the data display screen having a certain length, comprising the steps of:*

(*a*) *fetching first and second strings from said one or more files;*

(*b*) *simultaneously displaying on the data display screen portions of preselected fields of the first string within a first display area of width* $w_1$ *characters by height* $h_1$ *characters and portions of preselected fields of the second string within a second display area of width* $w_2$ *characters by height* $h_2$ *characters, and removing at least one character from the first string to generate said portions of said preselected fields of said first string, each of said portions of preselected fields of said first string having a displayed length of* $D_i$ *characters, the first and second display areas positioned within the area allocated to the process for display, whereby a user is simultaneously presented with portions of two or more different data strings; and*

(*c*) *changing the width w, while holding the height* $h_1$ *constant and in response thereto automatically only adjusting the display length of the fields of the first string by adjusting the displayed length* $D_i$ *of at least two of said preselected fields of the first string so that at least one character in each of said at least two preselected fields is displayed and so that some portion of all of said preselected fields of the first string continue to be displayed whereby a user is presented with portions of a plurality of different data strings the displayed length of whose fields increase or decrease conjointly.*

*30. In an interactive data entry computer system including a data display screen, an input device, a processor, and a storage device for storing n independent strings of data elements comprised of alphanumeric characters where n is a positive integer greater than one, each said string* $S_k$, *of length less than t characters where t is a positive integer, k is a positive integer less than or equal to n, each said string* $S_k$ *having data fields* $f_i$ *where I is a positive integer less than or equal to F, and F, the maximum number of fields, is a positive integer greater than or equal to three, said independent strings* $S_1$ *though* $S_n$ *classified into groups, a display system comprising:*

*fetching means in communication with said processor and said storage device for locating each said stored independent string* $S_k$;

*display means operative in a rack mode for displaying said strings on said data display screen, said display means operative in said rack mode in response to an input from the input device for actuating said fetching means and for simultaneously displaying a portion of at least one preselected field of a first string* $S_1$ *within a first display area within a certain display area of said display screen and a portion of at least one preselected field of a second string* $S_2$ *within a second display area within said certain display area;*

*said display means including means operative in said rack mode for arranging said displayed portions of said preselected fields of strings* $S_1$ *and* $S_2$ *in accordance with a display format;*

*said display means operative in a card mode in response to an input from the input device for actuating said fetching means and for displaying expanded portions of said string* $S_1$ *within said certain display area so that additional characters of string* $S_1$ *not displayed in said rack mode are displayed; and wherein said rack mode display comprises portions from at least 3 preselected fields* $f_a$, $f_b$ *and* $f_c$ *and further wherein said display means includes means for displaying some character of field* $f_c$ *on the same line as some character of field* $f_b$ *and vertically aligned with some character of field* $f_a$ *displayed on a different line from said some character of field* $f_c$;

*means for individually controlling the size of said fields* $f_a$, $f_b$ *and* $f_c$ *when displayed in said certain display area in said rack mode, wherein said size controlling means changes the size of said each preselected field in response to user input; and*

*means for switching between the card mode and rack mode of said display means without changing said display format for the rack mode display.*

*31. In an interactive data entry computer system including a data display screen for displaying data in horizontal lines, an input device, a processor, and a storage device for storing n independent strings of data elements comprised of alphanumeric characters where n is a positive integer greater than one, each said string $S_k$ of length less than t characters where t is a positive integer, k is a positive integer less than or equal to n, each said string $S_k$ having data fields $f_i$ where i is a positive integer less than or equal to F, and F, the number of fields, is a positive integer greater than or equal to 3, said independent strings $S_1$ through $S_n$ classified into groups, each group having strings with at least one similar data field, a display system comprising:*

*fetching means in communication with said storage device for locating each said stored independent string $S_k$;*

*display means for displaying said strings in a certain display area on said data display screen, said certain display area including a first display area of length $l_1$ characters less than t, and a second display area of length $l_2$ characters less than or equal to $l_1$, said display means in response to input form the input device for actuating said fetching means and said display screen for simultaneously displaying on the data display screen portions of at least three preselected fields $f_a$, $f_b$ and $f_c$ of a first independent string $S_1$ of a first group within said first display area so that some character of field $f_c$ is displayed on the same line as some character of field $f_b$ and vertically aligned with some character of field $f_a$ displayed on a different line from said some character of field $f_c$ and portions of preselected fields of a second independent string $S_2$ within said second display area wherein said display means displays an incomplete portion of string $S_1$ further including means for controlling the visual display of said fields within each said independent string as a single group, each said single group controlled individually, said controlling means in response to user input to effect the display of said display fields of said first string, effecting the display of all the fields within said first string differently.*

*32. The system of claim 1, 2, 6, 7, 9, 12, 15, 18, 20, 23, 33, 35, 36, 24, 37, 41, 43, 44, 45, 47, 48, 25, 49, 51, 52, or 53 wherein said first and second strings are in the same group.*

*33. The system of claim 2 wherein said string $S_2$ is in said first group and further including means for moving said string $S_2$ from said first group to said second group whereby said string $S_2$ is reclassified into said second group.*

*34. The system of claim 1, 2, 6, 7, 12, 15, 18, 20, 23, 33, 35, 36, 24, 37, 41, 43, 44, 45, 48, 25, 49, 51, 52, or 53 further including:*

*displaying state means for specifying display variables including a current string and a current group to be displayed;*

*program means actuated by commands from said input device for updating said display state means, said program means including means responsive to said commands for navigating to a different string in the current group if said strings $S_1$ and $S_2$ are in the same group and navigating to a different group if said strings $S_1$ and $S_2$ are in different groups wherein said program means updates said display state means; and*

*redisplay means for displaying on said display screen said portions of preselected fields of strings $S_1$ and $S_2$ as controlled by said display state means, said redisplay means actuated when no said commands are pending from said input device whereby said display screen is updated after a series of commands to reflect a cumulative result of said commands.*

*35. The system of claim 1 further including means for moving a content of one field $f_h$ to any other field $f_i$ within data string $S_1$ whereby the stored data elements of the storage device are modified to reflect the new contents in field $f_j$.*

*36. The system of claim 20 further wherein the field $f_h$ is displayed on a line of the data display screen and further including means for changing the line on said display screen on which field $f_h$ is displayed to a different line from the line on which field $f_h$ was displayed.*

*37. The system of claim 24 wherein strings $S_1$ and $S_2$ belong to different groups, string $S_1$ to a first group and string $S_2$ to a second group and further including:*

*means for designating said first string $S_1$ in said first group as a current string of said first group, and*

*means responsive to said input device for selecting said second group whereby said portions of said preselected fields of said string $S_2$ are displayed;*

*means responsive to said input device for preselecting said first group and;*

*means for automatically preselecting and redisplaying said portions of said preselected fields of the current string $S_1$ of said first group when first group is preselected.*

*38. The system of claim 1, 2, 6, 7, 9, 12, 15, 18, 20, 23, 33, 35, 36, 24, 37, 43, 44, 45, 47, 48, 25, 49, 52 or 53 further including expanded field display means for actuating said fetching means and said display means for displaying an expanded form of some field $f_z$ and further wherein said expanded field display means is responsive to said input device and further including means in response to the input device for restoring the original display of field $f_z$.*

*39. The system of claim 38 wherein said expanded field display means further includes means for scrolling a content of said field $f_z$.*

*40. The system of claim 1, 6, 7, 9, 12, 15, 18, 20, 23, 35, 36, 24, 37, 41, 43, 44, 45, 47, 48, 25, 49, 51, 52 or 53 wherein said strings $S_1$ and $S_2$ are in different groups.*

*41. The system of claim 24 wherein the display means includes means for expanding the area of display for a portion of a field $f_i$ of string $S_1$ so that the expanded area suppresses the display of another displayed portion of the string $S_1$.*

*42. The system of claim 24 wherein said strings $S_1$ and $S_2$ are in the same group.*

*43. The system of claim 24 further including means responsive to the input device for accepting display size dimensions and using said display size dimensions for causing shorter or longer portions of the fields of strings $S_1$ and $S_2$ to be displayed within said certain display area.*

*44. The system of claim 24 wherein a portion of some preselected field $f_i$ of string $S_1$ constitutes a sequence of at least two characters which are noncontiguous in the field $f_i$.*

*45. The system of claim 24 wherein field $f_i$ of string $S_1$ has a name associated with it, said name stored in said storage device, the system further including:*

*name display means operative in a first mode for displaying field $f_i$ without its said name within said certain display area;*

*and in a second mode for retrieving from said storage device said name and displaying said field $f_i$ with its said name within said certain display area; and*

*means responsive to said input device for switching between said first and second modes of said name display means.*

*46. The system of claim 40 wherein said string $S_2$ is in a first group and further including means for moving said string $S_2$ from said first group to a second group whereby said string $S_2$ is reclassified into said second group.*

*47. The system of claim 24 further wherein:*

*the display means includes display state means for specifying display variables including a current string and a current group to be displayed;*

*program means actuated by commands from said input device for updating said display state means, said program means including means responsive to said commands for navigating to a different string in the current group if said strings $S_1$ and $S_2$ are in the same group and navigating to a different group if said strings $S_1$ and $S_2$ are in different groups wherein said program means updates said display state means, and*

*the display state means further including redisplay means for displaying on said display screen said portions of preselected fields of strings $S_1$ and $S_2$ as controlled by said display state means, said redisplay means actuated when no commands are pending from said input device whereby said display screen is updated after a series of commands to reflect a cumulative result of said commands.*

*48. The system of claim 24 further including means for moving a content of one field $f_h$ to any other field $f_j$ within string $S_1$ whereby the stored data elements in the storage device are modified to reflect the new contents in field $f_j$.*

*49. The system of claim 24 further including means for editing a field $f_i$ of string $S_1$ when said portions of said preselected fields of string $S_1$ are displayed wherein said means for editing includes means for visually displaying an edited field within said certain display area as it is being edited.*

*50. The system of claim 20 wherein the strings in each group have at least one similar field.*

*51. The system of claim 20 wherein said expanded portions comprise portions from a plurality of fields in addition to said at least one preselected field of string $S_1$.*

*52. The system of claim 24 including means for causing said portions of said at least two preselected fields of said string $S_1$ to be displayed at a first instance in time and said portions of preselected fields of a said string $S_2$ displayed at a second instance in time and in the same area that said portions of said at least two preselected fields of said string $S_1$ were displayed.*

*53. The system of claim 25 further wherein said means for changing the length $l_1$ includes means for automatically changing the length $l_1$ in response to a change in length $l_2$.*

*54. The method of claim 26 wherein the first string is from a first file of said one or more files and including the step of fetching a third string from a second file and displaying portions of preselected fields of the third string within a third display area within the allocated display area simultaneously with the portions of the preselected fields of the first and second strings, the third display area having a length less than or equal to a length of the first display area.*

*55. The method of claim 26 wherein said first and second strings are in the same file.*

*56. The method of claim 26 further including the step of enabling editing of the first or second strings while portions of the first and second strings are displayed.*

*57. The method of claim 26 further including the step of preselecting and displaying portions of the first string in an area of length greater than a length of the first display area.*

*58. The method of claim 26 further including the steps of responding to a single command entered into the computer by a user and displaying additional portions of the first string on said display screen, and thereafter restoring the display of the prior portions of the first and second strings.*

*59. The method of claim 26 wherein the displayed portions of said preselected fields of the first and second strings occupy a portion of the data display screen and further including the step of alternatively displaying said portions of the first string on the data display screen while suppressing the display of the second string upon a command entered into the computer by a user.*

*60. The method of claim 27 further including the step of expanding an area of display for a portion of a field of the first string so that the expanded area suppresses the display of another portion of the first string.*

*61. The method of claim 29 further including the step of automatically changing the length $l_1$ in response to a change in length $l_2$.*

*62. The method of claim 27 further including the steps of enabling editing of either of the first and second strings while in the first mode of display and redisplaying an edited string in the first mode of display.*

*63. The method of claim 27 further including the steps of enabling editing of the first string while in the second mode of display, and redisplaying the edited first string in the second mode of display.*

*64. The method according to claim 27 further wherein the expanded portions of the first string displayed in the second display mode are portions of at least three preselected fields $f_a$, $f_b$ and $f_c$ of the first string so that some character of field $f_c$ is displayed on the same horizontal line as some character of field $f_b$ and vertically aligned with some character of field $f_a$ displayed on a different line from said some character of field $f_c$, and including the step of removing at least one character from the first string to generate said expanded portions of said preselected fields of string $S_1$.*

*65. The method according to claim 27 further wherein the expanded portions of the first string displayed in the second display mode are at least three fields $f_a$, $f_b$ and $f_c$ of the first string so that some character of field $f_c$ is displayed on the same horizontal line as some character of field $f_b$ and vertically aligned with some character of field $f_a$ displayed on a different line from said some character of field $f_c$.*

*66. The method according to claim 27 further wherein said first and second display areas are positioned on different horizontal lines of the data display screen and further including the step of displaying portions of each of a plurality of additional strings on other horizontal lines of the data display screen to fill the rack display area so that each line in the rack display area displays a portion of a different string.*

*67. The method according to claim 66 further including the steps of enabling editing of either of the first and second strings while in the first mode, and redisplaying an edited string in the first mode of display.*

*68. The method according to claim 67 further wherein the expanded portions of the first string displayed in the second display mode are portions of at least three preselected fields $f_a$, $f_b$ and $f_c$ of the first string so that some character of field $f_c$ is displayed on the same horizontal line as some character of field $f_b$ and vertically aligned with some character of field $f_a$ displayed on a different line from said some character of field $f_c$, and including the step of removing at least one character from the first string to generate said expanded portions of said preselected fields of said first string $S_1$.*

*69. The method according to claim 68 further including the steps of enabling editing, within the card display area, of*

*the first string while in the second mode, and redisplaying an edited string in the second mode.*

*70. The method according to claim 69 wherein said rack display area and said card display area occupy the same area of the data display screen at different instances in time.*

*71. The method of claim 66 further including the step of displaying at least portions of each of a plurality of fields of each said first second and additional strings displayed in the rack display area.*

*72. The method according to claim 71 further wherein the expanded portions of the first string displayed in the second display mode are portions of at least three preselected fields $f_a$, $f_b$ and $f_c$ of the first string so that some character of field $f_c$ is displayed on the same horizontal line as some character of field $f_b$ and vertically aligned with some character of field $f_a$ displayed on a different line from said some character of field $f_c$, and including the step of removing at least one character from the first string to generate said expanded portions of said preselected fields of said first string.*

*73. The method according to claim 72 further including the steps of enabling editing of either of the first and second strings while in the first mode, and redisplaying an edited string in the first mode of display.*

*74. The method according to claim 73 further including the steps of enabling editing, within the card display area, of the first string while in the second mode, and redisplaying an edited string in the second mode.*

*75. The method of claims 26, 54, 55, 56, 57, 58, 59, 27, 60, 28, 29, 61, 62, 63, 64, 65, 66, 67, 68, 69, 70, 71, 72, 73 or 74 further wherein said process is directed by execution of a single computer program in the computer.*

*76. The method of claim 75 further wherein said strings are of variable length.*

*77. The method of claims 26, 54, 55, 56, 57, 58, 59, 27, 60, 28, 29, 61, 62, 63, 64, 65, 66, 67, 68, 69, 70, 71, 72, 73 or 74 further wherein said strings are of variable length.*

*78. The method of claim 75 further wherein said computer program is a data base management program.*

*79. The system of claim 1, 2, 6, 7, 9, 12, 15, 18, 20, 23, 33, 35, 36, 24, 37, 41, 43, 44, 45, 47, 48, 25, 49, 52, or 53 further wherein the characters from some field $f_i$ of said string $S_1$ are simultaneously displayed on two or more lines within said first display area of the data display screen.*

*80. The system of claim 1,12, 20 or 24 further wherein said string $S_1$ includes information specifying a picture or ideograph and said picture or ideograph is displayed within said first display area on the data display screen.*

*81. The system of claim 1, 20, 41 or 31 further wherein said computer system can fit inside an attache case and has a display screen with limited display space smaller than the standard personal computer display size of 24 by 80 characters.*

*82. The system of claim 1, 20, 24 or 52 wherein said means for displaying displays a plurality of strings in one group in said certain display area and further includes means for scrolling to additional underplayed strings within said one group.*

*83. The system of claim 1,12, 20 or 37 wherein the displayed strings that are members of the group of which string $S_1$ is a member are displayed on different lines within said first display area.*

*84. The systems of claims 1, 20, 41 or 31 further including means for highlighting the display of the preselected portions of data string $S_1$.*

*85. The system of claim 1, 20, 24 or 52 wherein the preselected portion of field $f_i$ of string $S_1$ is a truncated portion of field $f_i$.*

*86. The systems of claims 1,12, 20 or 37 wherein some portions of field $f_i$ are only displayed by one said display means and not displayed by another said display means.*

*87. The system of claim 1, 20, 41 or 31 further including means to change the width of said certain display area.*

*88. The system of claim 1, 20, 24 or 52 further including means for individually controlling the size of said each preselected field $f_i$ in said first display area.*

*89. The systems of claims 24, 37, 41, 42, 43, 44, 45, 47, 48, 49, or 52 wherein said preselected portions of strings $S_1$ and $S_2$ are not displayed simultaneously.*

*90. The systems of claims 1,12, 20 or 37 further including program means operative by a command from said input device wherein said command executes the same function but effects a different display within said certain display area according to which of said display modes is operative.*

*91. The systems of claims 1, 20, 24 or 25 including a schema wherein said schema controls the size of a plurality of fields of said strings $S_k$ in a said group when displayed in a said display mode.*

*92. The system of claims 1, 20, 41 or 31 further wherein said display means includes means for receiving input specifying said specified positions of said portions of said a plurality of fields.*

*93. The system of claim 1, 6, 7, 9, 12, 13, 15, 18, 20, 23, 33, 36, 24, 37, 41, 43, 44, 45, 47, 48, 25, 49, 51, 52 or 53 wherein said input device is a data string input device, the length of each string $S_k$ is variable, said display system is a data retrieval system, and said data display screen is a data entry display screen.*

*94. The system of claim 1, 20, 24 or 52 further wherein the display width of at least one field of said string $S_1$ is calculated so that a portion of all fields assigned for display on some line within said first display area can be displayed on said some line within said first display area.*

*95. The system of claim 1,12, 20 or 37 further wherein each field $f_i$ of said string $S_1$ has a display length $D_i$ associated with it and further including means for displaying some said field $f_i$ within said first display area at a length other than $D_i$ without changing $D_i$.*

*96. The systems of claim 40 further wherein said first display area where string $S_1$ is displayed does not overlap said second display area where string $S_2$ is displayed.*

*97. The systems of claims 1,12, 20 or 37 further wherein the user can search for a string containing specified text.*

*98. The system of claim 1, 20, 41 or 31 wherein each said displayed string is presented to users as a piece of paper and each said group as a assembly of pieces of paper and further includes means to visually distinguish said displayed strings from each other on said data display screen in a separate visually distinct display area.*

*99. The system of claim 1, 20, 24 or 52 wherein said system is a data base management system.*

*100. The system of claim 1,12, 20 or 37 further including means to change the display width of some said field $f_i$ of said string $S_1$ without changing the length $l_1$ of said first display area in which said fields of said string $S_1$ are displayed.*

*101. The system of claim 1, 20, 41 or 31 further including additional strings from one of said groups and wherein said strings from said one of said groups are displayed on said data display screen according to a regular spatial format.*

*102. The systems of claims 1, 20, 41 or 31 wherein said one of said fields from which a character was removed is displayed on said line on which said plurality of fields are displayed.*

*103. The method of claims 26, 27, 62 or 64 further wherein said one of said fields from which a character was removed is displayed on said line on which said plurality of fields are displayed.*

*104. The system of claims 1, 20, 24 or 52 further wherein each said fields $f_i$ of said string $S_1$ can contain enough characters so that said display means must remove at least one character from said field to display portions of said field $f_i$ in said first display areas.*

*105. The system of claim 98 wherein said strings presented in said visually distinct display areas are presented as pieces of paper.*

* * * * *